United States Patent
Mohanty et al.

(10) Patent No.: US 7,256,223 B2
(45) Date of Patent: *Aug. 14, 2007

(54) ENVIRONMENTALLY FRIENDLY POLYLACTIDE-BASED COMPOSITE FORMULATIONS

(75) Inventors: Amar K. Mohanty, Okemos, MI (US); Lawrence T. Drzal, Okemos, MI (US); Brian P. Rook, Holt, MI (US); Manjusri Misra, Okemos, MI (US)

(73) Assignee: Michigan State University, Board of Trustees, East Lansing, MI (US)

( * ) Notice: Subject to any disclaimer, the term of this patent is extended or adjusted under 35 U.S.C. 154(b) by 251 days.

This patent is subject to a terminal disclaimer.

(21) Appl. No.: 11/032,608

(22) Filed: Jan. 10, 2005

(65) Prior Publication Data

US 2005/0123744 A1    Jun. 9, 2005

(51) Int. Cl.
*C08K 7/14* (2006.01)
*C08K 7/02* (2006.01)
*C08K 5/1515* (2006.01)

(52) U.S. Cl. .................. 523/124; 523/128; 523/500; 523/509; 523/511; 523/514; 523/515; 523/516; 523/521; 523/522; 523/523; 523/527; 524/35; 524/270; 524/271; 524/272; 524/273; 524/274; 524/296; 524/297; 524/308; 524/310; 524/314

(58) Field of Classification Search ................ 523/124, 523/128, 500, 509, 511, 514, 515, 516, 521, 523/522, 523, 527; 524/35, 270, 271, 272, 524/273, 274, 296, 297, 308, 310, 314

See application file for complete search history.

(56) References Cited

U.S. PATENT DOCUMENTS

| | | | |
|---|---|---|---|
| 3,951,714 A | 4/1976 | Franco | 156/62.2 |
| 4,225,374 A | 9/1980 | Kaufmann | 156/220 |
| 4,605,584 A | 8/1986 | Herr et al. | 428/142 |
| 4,804,429 A | 2/1989 | Appleyard et al. | 156/209 |
| 4,826,912 A | 5/1989 | Ko et al. | 524/567 |
| 5,180,765 A | 1/1993 | Sinclair | 524/306 |
| 5,252,642 A | 10/1993 | Sinclair et al. | 524/108 |
| 5,462,983 A | 10/1995 | Bloembergen et al. | 524/51 |
| 5,510,401 A | 4/1996 | Dehennau et al. | 524/47 |
| 5,556,905 A | 9/1996 | Frappier et al. | 524/311 |
| 5,670,237 A | 9/1997 | Shultz et al. | 428/173 |
| 5,696,186 A | 12/1997 | Videau | 524/48 |
| 5,700,865 A | 12/1997 | Lundquist | 524/506 |
| 5,756,651 A | 5/1998 | Chen et al. | 528/354 |
| 5,798,435 A | 8/1998 | Gruber et al. | 528/354 |
| 5,883,199 A | 3/1999 | McCarthy et al. | 525/437 |
| 5,908,918 A | 6/1999 | Chen et al. | 528/354 |
| 5,922,832 A | 7/1999 | Randall et al. | 528/354 |
| 5,945,472 A | 8/1999 | Duong et al. | 524/425 |
| 5,952,088 A | 9/1999 | Tsai et al. | 428/297.7 |
| 5,998,552 A | 12/1999 | Gruber et al. | 525/450 |
| 6,291,597 B1 | 9/2001 | Gruber et al. | 525/450 |
| 6,469,133 B2 | 10/2002 | Baker et al. | 528/354 |
| 6,869,985 B2 * | 3/2005 | Mohanty et al. | 523/124 |
| 2003/0078323 A1 | 4/2003 | Zhang et al. | 524/17 |

FOREIGN PATENT DOCUMENTS

| | | |
|---|---|---|
| WO | WO 92/04412 | 3/1992 |
| WO | WO 02/10489 | 2/2002 |

OTHER PUBLICATIONS

USPTO obtained translation of DE 199 54 484 A1 (May 17, 2001), Sommer et al.
Derwent translation of JP10-120889-A (May 12, 1998) Watanabe et al.
Derwent translation of JP11-227147-A (Aug. 24, 1999) Hanamoto et al.

* cited by examiner

*Primary Examiner*—Kriellion A Sanders

(57) ABSTRACT

Polymeric materials and products, including sheet flooring materials prepared from the polymeric materials, and processes for preparing the polymeric materials, are disclosed. The polymeric materials include a polylactic acid-based polymer in combination with plasticizer and a compatibilizer, and optionally include a filler. The polymeric material can include between about 30 to about 50 percent by weight polyvinyl chloride, polyethylene glycol, polyglycolide, ethylene vinyl acetate, polycarbonate, polycaprolactone, polyhydroxyalkanoates, or polyolefins modified with polar groups, for example, ionomers. The plasticizer is typically an epoxidized vegetable oil or esterified and epoxidized vegetable oil and is typically present in an amount of between about 10 and about 50% by weight. In some embodiments, the compatibilizer is a polyolefin modified with one or more polar functional groups, and is typically present in an amount of between about 5 and about 10% by weight. The material can be used in decorative surface coverings, such as a floor coverings, particularly when it is in the form of a polymeric sheet. The polymeric material can be present in at least one layer of a floor covering, which floor covering can also include one or more additional layers such as wear layers, foamed or foamable layers, top coat layers and design layers. The additional layers can also include the polymeric material.

43 Claims, 5 Drawing Sheets

SCHEMATIC DIAGRAM OF EXTRUSION PROCESS

Schematic Diagram of ZSK-30 Extruder Screws and Barrels

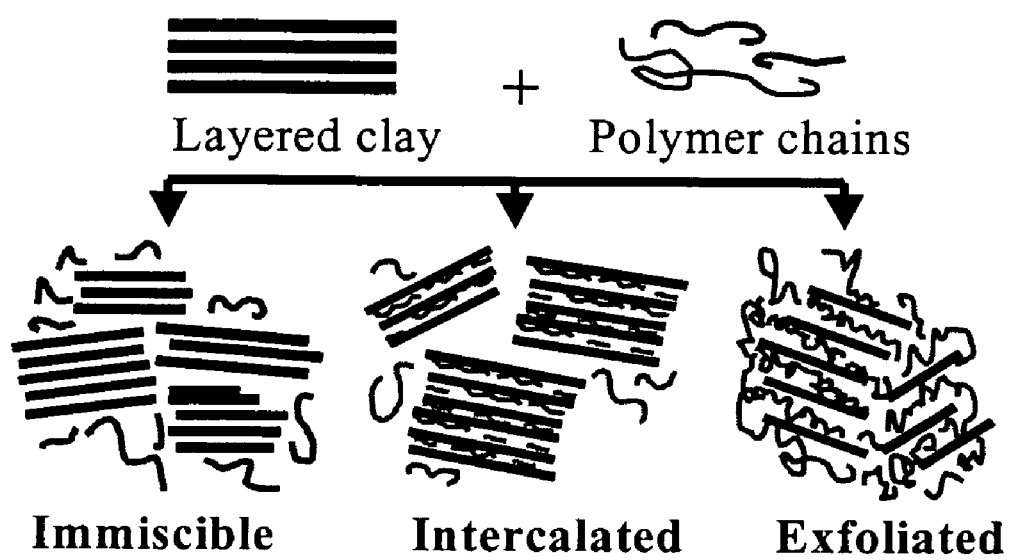
Figure 5: Structures of possible morphologies when processing organo-clay with polymers

ENVIRONMENTALLY FRIENDLY POLYLACTIDE-BASED COMPOSITE FORMULATIONS

FIELD OF THE INVENTION

The present invention relates to polylactide-based products and more particularly to durable tile or sheet form floor coverings made of one or more layers of polymers suitable for e.g. pedestrian traffic in domestic and/or other situations over an extended period of time.

BACKGROUND OF THE INVENTION

Most flooring materials are currently prepared from polyvinyl chloride (PVC). PVC usually contains significant amounts of phthalate plasticizers (more than about 30% by weight based on PVC) to produce sufficient flexibility and impact strength for flooring material applications. The flooring materials are typically prepared by thermo-mechanical mixing of PVC, phthalate plasticizer, fillers like calcium carbonate and additives followed by a calendaring process to prepare the desired flooring sheets. Examples of various processes are described in the literature and include the following patents incorporated by reference; U.S. Pat. No. 4,826,912, U.S. Pat. No. 4,804,429, U.S. Pat. Nos. 4,225,374, 3,951,714, U.S. Pat. No. 4,605,584, U.S. Pat. Nos. 5,670,237, 5,700,865, and U.S. Pat. No. 5,945,472. There is an interest in developing alternative materials for use in flooring.

Research has been undertaken in some areas of plastics engineering to use biodegradable materials. For example, U.S. Pat. No. 5,883,199 by McCarthy et al., the contents of which are hereby incorporated by reference in their entirety, discloses plastics including aliphatic polyesters that can be blended with PLA (polylactic acid or polylactide) to plasticize the PLA so it can be recycled and used again in packaging. Purportedly, the blends can be used to make biodegradable plastic film, sheets, and other products by conventional processing methods such as blown film, extrusion, and injection molding methods. The resulting blends can be used to manufacture bags, food packaging, laminated papers, food trays, fishing line, net, rope, diapers, disposable medical supplies, sanitary napkins, shampoo, drug, cosmetic, and beverage bottles, cutlery, brushes, combs, molded and extruded foamed articles such as packing material and cups, and cushions for flexible packing. These blends purportedly provide not only the excellent processibility of polyethylene, but also posses properties such as those of polyethylene terephthalate. In addition, these blends can purportedly be processed into films that are heat-sealable, unlike polyethylene terephthalate.

U.S. Pat. Nos. 5,756,651 and 5,908,918 by Chen et. al., the contents of which are hereby incorporated by reference in their entirety, disclose blending polycaprolactone and polyethylene glycol with PLA for packaging film applications. Acetyl tri-n-butyl citrate, sold under the trademark "CITROFLEX A-4" was chosen as a plasticizer for the study based on its degradability, non-toxicity, and compatibility with PLA. Epoxidized soy oil was used as a co-plasticizer in some occasions. With the blown films, about 3% of talc and 1% of calcium stearate were added for anti-blocking purposes.

U.S. Pat. Nos. 5,998,552 and 6,291,597 to Gruber et. al., the contents of which are hereby incorporated by reference in their entirety, teaches preparing a polymer composition by providing PLA polymer molecules which have been modified, relative to linear non-substituted PLA, to provide increased molecular interaction among PLA backbone chains in the composition. The prior art to date appears to have focused on using epoxidized soybean oil, linseed oil and citrate plasticizers with these polymer compositions, and has not applied the technology to the flooring arts.

In light of the growing environmental awareness, increasing societal concern and new environmental rules and regulations, it would be advantageous to have ecologically friendly green materials for flooring applications that provide the flooring with desirable physical and mechanical properties. The present invention provides such materials and flooring.

SUMMARY OF THE INVENTION

Polymeric materials and products, including sheet flooring materials prepared from the polymeric materials, and processes for preparing the polymeric materials, are disclosed. The polymeric materials include a polylactic acid-based polymer in combination with plasticizer and a compatibilizer, and optionally include a filler. The polymeric materials can be in the form of a sheet or other desired shapes.

Although in some embodiments, the polylactic acid-based polymeric material is predominantly poly-L-lactide, it can also include between about 30 to about 50 percent by weight polyvinyl chloride, polyethylene glycol, polyglycolide, ethylene vinyl acetate, polycarbonate, polycaprolactone, polyhydroxyalkanoates, or polyolefins modified with polar groups, for example, ionomers.

In some embodiments, the plasticizer is an epoxidized vegetable oil or esterified and epoxidized vegetable oil. The plasticizer is typically present in an amount of between about 10 and about 50% by weight, for example, between about 25 and about 35% by weight, based on the polymeric material.

In some embodiments, the compatibilizer is a polyolefin modified with one or more polar functional groups. The compatibilizer is typically present in an amount of between about 5 and about 10% by weight based on the polymeric material.

The polymeric material can be used to prepare a component of a decorative surface covering, such as a floor covering. The polymeric material is particularly useful as a component of a floor covering when it is in the form of a polymeric sheet. The polymeric material can be present in at least one layer of a floor covering, which floor covering can also include one or more additional layers such as wear layers, foamed or foamable layers, top coat layers and design layers. The additional layers can also include the polymeric material. The material can also be mixed with cellulosic fibers like Kenaf, Industrial Hemp, Flax, Jute, Sisal, Henequen, Wood fiber, Grasses and Straws (Corn/Wheat/Rice) to form composites, such as natural/cellulose fiber composites. The material can also be mixed with organoclays to form composites, such as nanocomposites.

The polymeric material can be prepared, for example, by mixing a polylactic acid-based polymeric material, a plasticizer and a compatibilizer, and optionally a filler, heating the mixture, forming the heated mixture into a desired shape, or forming the mixture into sheets, and allowing the formed, heated mixture to cool and solidify.

BRIEF DESCRIPTION OF THE DRAWINGS

FIG. 5 is an illustration of structures of morphologies observed when processing organoclay with the polymeric material described herein.

DETAILED DESCRIPTION OF THE INVENTION

Figure 1:
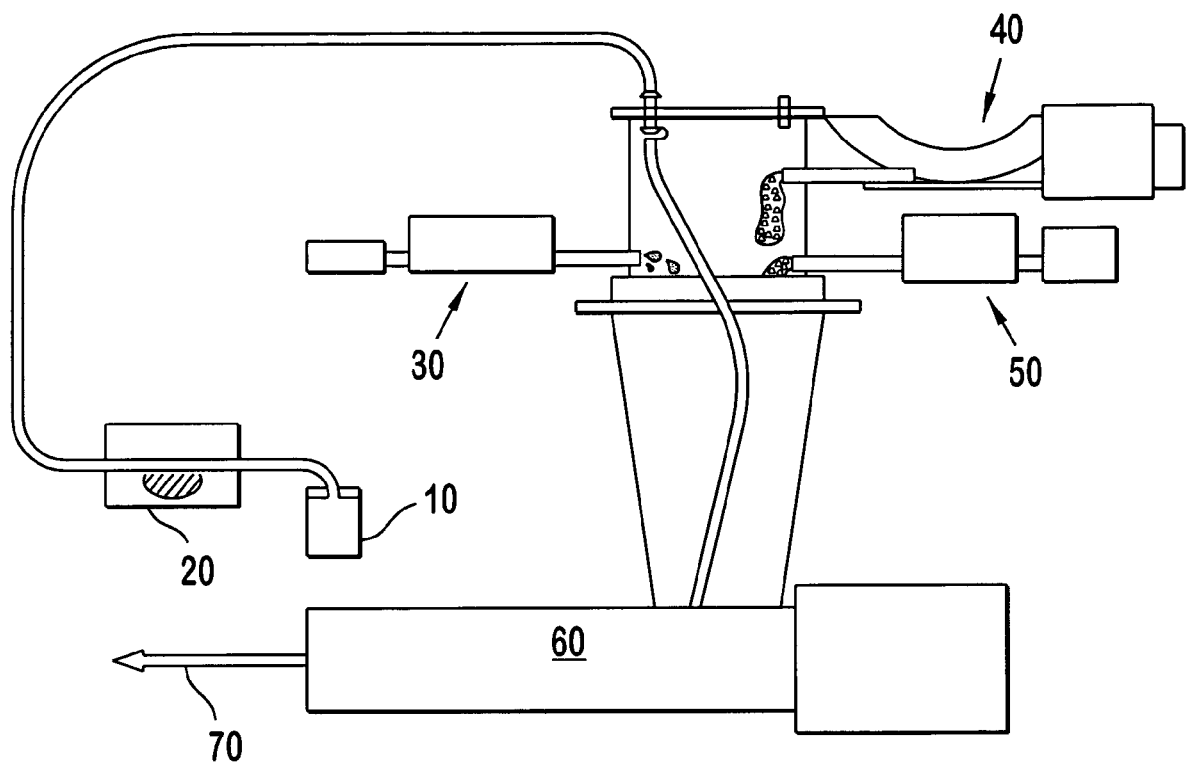
FIG. 1 is a schematic illustration of one embodiment of an extrusion process used to prepare the polymeric materials.

Polymeric materials and sheet flooring materials prepared from the polymeric materials are disclosed. The polymeric materials include a polylactic acid-based polymer, in combination with plasticizer and a compatibilizer.

One advantage of using the polymeric material described herein is that it is readily biodegradable and in at least in some embodiments is naturally occurring, and can also be used in connection with a biodegradable plasticizer, which plasticizer can be derived from naturally occurring materials. The use of a biodegradable polymer and, optionally, plasticizer can significantly reduce environmental problems caused by the migration of phthalate plasticizers out of the material after disposal. One advantage of using the compatibilizer is that it tends to coat the polylactide-based material and keep water away, which prohibits significant decomposition of the materials in use, but permits decomposition when the material is removed and placed in a landfill or other suitable location where the material is subject to environmental conditions, optionally in the presence of suitable enzymes to break down the polymers.

The polymeric material described herein, by virtue of its biodegradability, can help alleviate the environmental stress due to disposal of items such as packaging materials, coated paper products, films, single use diapers and the like. Although in some embodiments, the material is resilient enough to be used in resilient floor covering applications, in other embodiments, the material is tough enough to use in other embodiments, such as floor tiles. The material can be used, generally, for decorative and/or protective coverings and composites, as well as other applications, such as automotive, truck, and recreational vehicle components; reusable material-handling containers; wall coverings; shelving; agricultural and industrial bins and conveyors; trash and recycling receptacles; and home, office, and industrial furniture and fixtures, as well as in other articles of manufacture that use polymeric materials.

I. Polymeric Materials

Polylactic Acid-Based Polymer

PLA is a thermoplastic polyester of 2-hydroxy lactate (lactic acid) or lactide. The formula of the subunit is: —[O—CH(CH3)—CO]— The alpha-carbon of the monomer is optically active (L-configuration). The polylactic acid-based polymer is typically selected from the group consisting of D-polylactic acid, L-polylactic acid, D,L-polylactic acid, meso-polylactic acid, and any combination of D-polylactic acid, L-polylactic acid, D,L-polylactic acid and meso-polylactic acid. In one embodiment, the polylactic acid-based material includes predominantly PLLA (poly-L-Lactic acid). In one embodiment, the number average molecular weight is about 140,000, although a workable range for the polymer is between about 15,000 and about 300,000. In one embodiment, the PLA is L9000™ (Biomer, Germany, a polylactic acid). Representative properties of the material appear in Table 2.

The various physical and mechanical properties vary with change of racemic content, and as the racemic content increases the PLA becomes amorphous, as described, for example, in U.S. Pat. No. 6,469,133, the contents of which are hereby incorporated by reference. In one embodiment, the polymeric material includes relatively low (less than about 5%) amounts of the racemic form of the polylactic acid. When the PLA content rises above about 5% of the racemic form, the amorphous nature of the racemic form may alter the physical and/or mechanical properties of the resulting material.

Optional Additional Polymers

Additional polymers can be added so long as they are compatible with the polylactic acid-based polymers. In one embodiment, compatibility is miscibility (defined as one polymer being able to blend with another polymer without a phase separation between the polymers) such that the polymer and the polylactic acid-based polymer are miscible under conditions of use. Typically, polymers with some degree of polar character can be used, and polymers that have little or no polar character (i.e., unsubstituted polyolefins) cannot be used except as performance modifers.

Other polymer resins outside those specified may be used in admixture with the specified ones e.g. in order to "extend" the specified polylactide resin for reasons of economy by using a cheaper resin, or to modify finish or other characteristics. The amount of such other polymer resin that may be used will depend primarily on how they affect the fluidity and spread coating characteristics of the materials described herein. For example, the other resins can be present in an amount up to around 50 to 60% w/w of the other polymer resin (relative to the total polymer resin) depending on the required use and properties of the sheet layer. Suitable polymeric resins include relatively polar polymers that are miscible with the polylactide, such as polyvinyl chloride, polyethylene glycol, polyglycolide, ethylene vinyl acetate, polycarbonate, polycaprolactone, polyhydroxyalkanoates (polyesters), polyolefins modified with polar groups such as maleic anhydride and others, ionomers, e.g. SURLYN® (DuPont Company), epoxidized natural rubber and other epoxidized polymers, polyethylene glycol and polyglycolide. Material properties appear in.

In certain instances, incompatible or partially compatible polymers can also be added to improve the impact properties of the resulting flooring. Examples of suitable materials include EPDM rubbers, such as Polysar™ manufactured by Bayer; A/B/A block copolymers, such as Kraton® manufactured by Shell; and multiple domain elastomer systems, such as those described in European Patent No. 583,926.

When poly (ethylene glycol) was added, the impact strength was improved and the film became softer. Poly (ethylene glycol) possibly acts like a plasticizer in terms of reducing Tg and Young's modulus of the polymer blends. Polycaprolactone and Poly (lactic acid-co-caprolactone)) did not enhance the impact strength of the films as much as plasticizers and poly(ethylene glycol). However, they increased the tensile strength at yield point of the films. Accordingly, incorporating polycaprolactone and rubber additives into the polylactic acid-based materials along with plasticizer and poly(ethylene glycol) can make the film strong and flexible as well as impact-resistant.

Plasticizers

Any plasticizer capable of plasticizing the polylactic acid-based materials can be used. Suitable plasticizers can be selected from phthalates, allyl phosphate esters, dialkylether diesters, tricarboxylic esters, epoxidized oils, epoxidized esters, polyesters, polyglycol diesters, alkyl, allyl ether diesters, aliphatic diesters, alkylether monoesters, citrate esters, dicarboxylic esters, vegetable oils, glycerine esters and other plasticizers used in conventional polyvinyl chloride applications. Material properties appear in Tables 3-15 & 17-27. Plastics, advantageously biodegradable plastics like polycaprolactones and aliphatic/aliphatic-aromatic co-polyesters, and low molecular weight plasticizers used for synthetic plastics can also be used. Material properties appear in Table 16.

In one embodiment, the plasticizers are epoxidized or otherwise derivatized vegetable oils, for example epoxidized soybean oils such as epoxidized methyl soyate MSO, epoxidized linseed oil, (ELO), epoxidized soy oil (ESO), epoxidized tall oil (ETO) and the like. Higher esters (i.e., $C_{4-8}$ alkyl), for example, like those available commercially from Atofina, are also acceptable.

MSO and its higher derivatives are very unique plasticizers in that they are 100% biodegradable and low cost in comparison to others and show equivalent properties.

In one embodiment, the plasticizer is an ecologically friendly citrate-based plasticizer that includes a blend of citrate and derivatized vegetable oil. Material properties appear in Tables 9, 10, 25 and 27. However, other plasticizers, such as those conventionally used in conjunction with polyvinyl chloride can also be used, alone or in combination with the vegetable oil plasticizers. Material properties appear in Tables 11, 12, 22, 23, and 24.

The plasticizer is typically present in a range of between about 10 and about 40 percent by weight of the polymeric material. Below 10 percent, the plasticizer typically does not effectively plasticize the polymeric material, and above about 40 percent, it tends to leach out of the polymeric material. For optimal flexibility, the range of plasticizer tends to be between about 25 and about 35 percent by weight of the polymeric material. However, for embodiments where physical strength is important, a lower percentage of plasticizer is acceptable.

When epoxidized soy oil (not the soy oil ester) was added as a co-plasticizer of CITROFLEX® A-4 (Morflex), no effect on tensile and impact properties was observed. This suggests that epoxidized soy oil is not as effective a plasticizer as CITROFLEX® A-4 for the polylactic acid-based materials. However, its low price and possible role as lubricant during processing nonetheless make it attractive as an additive.

Compatibilizer

A compatibilizer is used to keep the polymer and plasticizer miscible and avoid having the plasticizer leach out of the polymer. Examples of suitable compatibilizers include polyolefins modified with maleic anhydride. The compatibilizer is advantageously used at a concentration between about 5 and about 10 percent by weight of the polymeric material, although other concentrations can be used so long as they are effective at keeping the plasticizer and polymer miscible. Maleated Polyolefins/Polybutadienes/Polystyrenes are commercially available compatibilizers, sold by Eastman (EPOLENES®), Crompton (POLYBONDS®), Honeywell (A-C®), and Sartomer (Ricons®) Maleated and epoxidized rubbers, advantageously derived from natural rubbers, are also useful as compatibilizers. Other carboxylic acid modified polyolefin copolymers, such as those from succinic anhydride, can also be used. Monomers such as maleic anhydride, succinic anhydride and the like can also be added directly along with or without commercial compatibilizers to prepare in situ compatabilized blend compositions.

Additives

Additives that may be used and the amounts of such additives, will depend on the function and desired properties of the sheet material and may also, to some extent, depend upon the particular polymer resins used. Principal additives and additional processing steps generally well known in the art, that may be mentioned include the following: antioxidants such as hindered phenyls, UV light absorbers and stabilizers, lubricants, metal release agents to aid in processing, and thermal stabilizers.

Inorganic fillers and reinforcements can enhance the various polylactic acid-based layer(s) in floor covering materials including the polymeric material described herein. This enhancement can be through improvements in appearance, physical properties, or chemical characteristics. The particular inorganic filler/reinforcement attributes that are important are the nature of the inorganic material, the shape of the material, and any surface treatment or coating. There are many important aspects of the inorganic material. Density is important in the application and long term utility of a floor covering. Highly filled back coat layers (e.g. up to 85% by weight of filler) can be very useful in this regard. Another basic material attribute is hardness. Increased hardness is desirable in the final product, but too hard a filler (such as silica) can have negative effects on the wear of processing equipment, such as melt mixers and extruders. Table 1 lists some common inorganic fillers/reinforcements.

TABLE 1

| Inorganic/organic Material | Density g/cc |
| --- | --- |
| Calcium Carbonate | 2.7 |
| Talc | 2.9 |
| Mica | 2.6 |
| Glass Fibres | 2.6 |
| Silica | 2.5 |
| Wollastonite | 2.9 |
| Aluminium Trihydrate | 2.4 |
| Magnesium Hydroxide | 2.3 |
| Titanium Dioxide | 4.2 |
| Exfoliated Nano-Clay | 2.6 |
| Bio/natural fibers including, but not limited to: Kenaf, Jute, Hemp, Sisal, Corn Stalk, Grass fibers, Wood fiber | 1.1-1.4 |

Whiting filler can be used to increase opacity. The optical properties of titanium dioxide make it a particularly good pigment in obtaining a white color with good opacity. Such a color is desirable in the layer upon which a printed design is placed. The design layer is located below a transparent wear layer or in the bulk of a through color homogeneous wear layer. Lower levels of titanium dioxide can be employed if a white filler such as calcium carbonate is used at moderate levels in this layer.

Calcium carbonate is of particular utility. Hardness, stiffness, heat deflection temperature, slip resistance, stress crack resistance, weldability, printability, and antiblock characteristics are all improved. Thermal shrinkage and elongation, as well as water vapor and oxygen permeability are decreased.

Talc is another filler well suited to enhance the polymer formulations for floor covering. It has a lamellar structure in contrast to the low aspect particulate structure of calcium carbonate. This lamellar form allows talc to be more effective than calcium carbonate with regard to increasing stiffness, heat deflection temperature and dimensional stability. The disadvantage of talc relative to calcium carbonate center on reduced impact strength, matt surface, and lower thermo-oxidative stability. Mica also has a lamellar structure and has similar advantages and disadvantages.

High aspect ratio fillers/reinforcements such as wollastonite and glass fibers, can have an even stronger effect than talc and mica on increasing the modulus of elasticity, tensile strength, and heat-distortion temperature of polylactic acid-based systems.

The improvements provided by high aspect ratio inorganic additives would be of particular assistance in these floor covering systems made using a permanent plasticizer or processing aid, such as liquid paraffin. In these cases, the stiffening action of such additives would compensate for the loss of stiffness produced by the liquid paraffin.

Silica in its fumed or precipitated forms can be useful at low levels (0.1 to 1.5%) in the polylactic acid formulations where antiblocking and printability is of importance. In the floor covering system these would be in the wear layer and in the layer upon which the printed design is applied.

Alumina trihydrate and magnesium hydroxide, in the correct particle sizes which for most systems are less than 40 microns in diameter, can provide the same type of property enhancement provided by calcium carbonate. In addition, they can provide useful fire resistance and smoke control characteristics.

The polymeric materials, when used in floor covering systems, can be enhanced by using thermal and light stabilizers. For thermal stabilizers the amount and type that should be used will vary with the actual process used to fabricate the final structure. The melt spreader approach can provide a product having less heat history than either the melt calendering or extrusion routes. In some cases, however, the polymeric materials can be exposed to temperatures over 200° C. for some time during the process.

Suitable stabilizers include hindered phenol, optionally with co-stabilizers such as organosulphur compounds, for example, DSTDP. Good thermal stability can be obtained using a high molecular weight hindered phenol, such as Irganox® 1010 from Ciba-Geigy, with one or more secondary antioxidants such as thioethers and phosphorus compounds. Distearylthiodipropionate (DSTDP) and Ultranox® 626 from GE are examples of these types of materials. An effective thermal stabilizer package from such systems is 0.1% Irganox® 1010, 0.1% DSTDP and 0.05% Ultranox® 626.

Hindered amine light stabilizers (HALS) are particularly effective in protecting the polymers from photo-oxidation. A Polymeric HALS, such as Luchem™ HA-B18 from Atochem, is particularly effective in its own right and has the added advantage of showing no antagonism for other additives such as DSTDP. The inclusion of 0.3% of Luchem™ HA-B18 in the outer wear layer and 0.15% in the layer just below the transparent wear layer will greatly enhance the light resistance of the floor covering.

Lubricants and processing aids can be used to manufacture the flooring. This will be very dependent on the specific process. For extrusion or melt calendering operations an external lubricant may be of assistance. Calcium and zinc stearate are appropriate as external lubricants. They also can provide some additional stabilization support. They can be added in the 0.1 to 1.0%, preferably 0.2 to 1.0% range is needed.

Processing aids may be used in polymeric materials to adjust or accentuate particular processing characteristics such as reduced energy requirements and/or increased processing speed.

The flammability and smoke generation of the polymeric materials, polymeric sheets and floor coverings including the polymeric sheets can be improved using various additives. Various inorganic compounds, such as aluminum trihydrate and magnesium hydroxide, that give off water at elevated temperatures are useful as dual fillers/flame retardants. Phosphorous compounds, borates, and zinc oxide all can play useful roles in improving the fire characteristics of polylactic acid-based systems.

In addition, peroxides or other crosslinking agents can be advantageously added to the polymeric material and, when heated, can cause the material to crosslink. Examples of suitable peroxides and crosslinking agents are well known to those of skill in the art.

Other additives that can be included in the polymeric material include dyes, inks, antioxidants, etc. which are generally used in relatively small amounts at less than 50 PHR.

Anti-static characteristics can also be important for some applications. Many anti-static additives are compounds with hydrophilic and hydrophobic sections. A common material of this type is a mono ester of a polyol, such as glycerol, with a long chain fatty acid, such as stearic acid.

Rosin can also be added.

Nanocomposites

Nano-reinforcements of polymers have strong promise in designing eco-friendly nanocomposites for several applications. Nano fiber has the dimensions of less than or equal to one billionth of a meter, or one nanometer. Such a composite is called a "nanocomposite." One of the reasons for this attention is that due to the "nano-scale" dispersion, even with very low level of nano reinforcements (1 to 5 wt %) which results in high aspect ratio and surface area, the reinforcement efficiency of nanocomposites can be significantly better than the conventional mineral fillers. The conventional glass fiber has a modulus of ~72 GPa vs. ~172 GPa for nano-clay.

Currently, the most heavily researched type of nanocomposite uses layered mineral clays (typical clay is montmorillonite) as the reinforcing phase. Montmorillonite is hydrophilic which makes proper exfoliation and dispersion into the polymers difficult. Thus, montmorillonite is usually modified through substitution of sodium ions with organic onium ions. Such chemical modification expands the gallery of clays and thus creates more opportunities to improve the compatibility of such organically modified clay with the polymer matrix. Three ways of processing in making nanocomposites are: (i) Solution technique (ii) In-situ polymerization and (iii) Melt compounding. Melt compounding would attain more commercial attraction. FIG. 5 depicts the possible morphologies as would be developed during processing of polymer-clay nanocomposites. Biopolymers need to be modified (formulated) to make them suitable for matrix polymers. The adhesion between clay and biopolymer as well as effective dispersion through optimized processing is also essential. The use of coupling agent also improves the clay-polymer matrix adhesion. The extent of intercalation and exfoliation of nano clays in biopolymer matrix affects the performance of the resulting nanocomposites. Thus the above-described factors in combination are expected to act synergistically in designing high performance green nanocomposites. In one embodiment, nanocomposite materials are formed by combining the polylactides described herein with a suitable plasticizer and compatibilizer, along with one or more organo-clays (0.5 to 2 wt. %).

Natural/bio fibers: Natural fibers, alone or in combination with synthetic fibers, can be used to reinforce the plastic material described herein. The natural fibers can serve as reinforcement by enhancing the strength and stiffness and reducing the weight of the resulting composite structures. The properties of natural fibers vary with their source and treatment. The mechanical properties depend on whether the fibers are taken from plant stem or leaf, the quality of the plant locations, the age of the plant and the extraction process (retting) adopted to collect the fiber from the plants. Depending on their origin, the natural fibers may be grouped into: bast (stem), leaf and seed types. Examples include: (i) Bast: Jute, Flax, Kenaf, Hemp and Ramie; (ii) Leaf Sisal, henequen and pineapple leaf fiber (PALF); (iii) Seed/fruit: Cotton, coir and kapok. The natural fibers are lignocellulosic in nature and are primarily include cellulose, hemicellulose and lignin. The various chemical constituents of a specific natural fiber can also vary considerably. Such variation may be due to the origin, age, retting (mode of extraction of fiber from the source) process adopted, etc. Among all the natural fibers listed, coir is observed to contain least amount of cellulose but the highest percent of lignin. The amount of cellulose, in lignocellulosic systems, can vary depending on the species and age of the plant/species. The lignin, being polyfunctional, exists in combination with more than one neighboring chain molecules of cellulose and/or hemicellulose, making a crosslinked structure. The natural fibers are hydrophilic in nature, with moisture contents typically ranging between 8 and 13% by weight.

Natural fiber composites can replace glass fiber composites in many applications. The main advantages of natural fibers are: low density, comparable specific strength, favorable mechanical and acoustic properties, favorable processing properties (for example, low wear on tools, favorable energy absorption performance, high stability, and no splintering unlike fiberglass), potential for one-step manufacturing even of complex construction elements, occupational health benefits compared to glass, no off-gassing of toxic compounds in contrast to phenyl-resin bonded wood, a favorable ecological balance for part production, weight reduction and relatively low cost.

II. Sheets Including the Polymeric Materials

In addition to other desired shapes, the polymeric materials can be formed into sheets. The sheet materials can be prepared by:

a) providing a suitable polylactic acid, a suitable amount of a plasticizer and at least one additive comprising a filler, b) heating and mixing to a suitable processing temperature, c) forming the material into a sheet form, typically by spread coating or calendering, and d) cooling the resulting sheet, optionally embossing the sheet if desired while the sheet is at an elevated temperature.

A variety of well-known processing equipment can be used to heat and thoroughly mix the materials. These include but are not limited to extruders, banburys, mills and kneaders.

In one embodiment, the polymeric material, plasticizer and filler are intimately mixed in a high shear mixer for a suitable period of time (until materials are fully melted and mixed) at a suitably elevated temperature (typically at least 75° C., and in some embodiments, between about 100 and about 250° C., most typically from between about 130 and about 200° C., to melt the polylactic acid and bring the mixture into a substantially fluid state without substantially degrading the mixture. The material properties of one such material appear in Table 27.

III. Flooring Materials Incorporating Sheets of the Polymeric Materials

The sheets formed from the polymeric materials can be used as one or more layers in floor coverings based on more or less conventional spread coating or calendering technology. Floor covering including at least one layer of a sheet material formed from the polymeric material described herein. In general, homogeneous sheet and tile flooring are formed from filled systems containing 10-85% filler in a matrix of polymer and plasticizer. Alternatively, heterogeneous floor coverings include two or more different layers having particular functions, bonded together. For example, floor coverings typically include a foamed layer to provide cushioning; a substrate, a solid backcoat layer; a wear layer and/or a top coat layer. Carriers or substrates such as woven or non-woven mesh or fabric, tissue, and glass webs and fibers can also be used. The polymeric materials described herein can be used to form a substrate layer, a wear layer, and can even be foamed using conventional foaming technology to form a foam layer. Various design features can be included as well, and the layers can be physically and/or mechanically embossed, ideally in register with a particular design pattern. Graphic images can also be incorporated into the flooring to provide an image with depth perception, as described, for example, in U.S. Pat. No. 5,347,296, the contents of which are hereby incorporated by reference in their entirety.

Foaming

For some types of applications little or no expansion in some or all layers of the floor covering structure is required. However, the floor coverings can range from those floor coverings where all layers except the topcoat are foamed to those where none of the constituent layers are foamed. The foam can be a closed cell foam. The layers can be foamed by using a chemical blowing agent. Azo compounds are especially effective. An example of this class of compounds is Azodicarbonamide (Celogen AZ from Uniroyal). A particularly useful feature of this compound is that its decomposition point can be reduced from 220° C. to less than 170° C. by using activators such as zinc oxide. Inhibitors such as benzotriazole can also be used. If inks containing benzotriazole are used to print on the surface of a foamable substrate or layer containing Celogen AZ and zinc oxide and the resulting structure, with a wear layer added over the foamable layer, is heated to temperature between the activated and inactivated decomposition temperatures, then a raised pattern (chemical embossing) is created in the sample. A supplemental blowing agent such as aluminum trihydrate can also be used, as it not only acts as a flame retardant but also gives off water vapor when heated above 200° C. A volatile fugitive processing aid or plasticizer can also have a useful role as a supplemental blowing agent.

Mechanical blowing techniques can also be used, in combination with or in place of chemical blowing agents. This typically involves mixing air or another gas in with the polymeric material under conditions that will produce the desired number and size of cells in the resulting foam. In the spread coating system the mixture as applied needs to have a foam structure near to that of desired product. In the extrusion or calendering process the gas needs to be in solution in the polymer or as small micro bubbles at the melt pressure in the extruder system. Expansion takes place as the melt leaves the extruder and goes from high pressure (100 to 700 PSI) to atmospheric pressure. In both cases, it is important for the cell structure to be frozen at the desired size by a rapid drop in the sheet temperature to below that needed for cell contraction or deformation.

Melt Calendaring

Melt calendering can also be used to produce the floor coverings. Although both rolling sheet and viscous blank calendering can be employed, rolling sheet may be preferred when a glass fiber web is used as a substrate.

A multilayer laminate can be prepared by applying a series of melts. These melt calendering operations can all be done in a continuous way using a series of calendering rolls, or they may be done in a segmented fashion with a single layer being applied followed by a wind up operation with additional layers being added in separate operations. In addition, a combination of continuous and discontinuous calendering operations can be employed. Thus for example, a saturant formulation can be applied to a glass fiber web followed by a foamable layer on top and a base layer beneath. These three operations being carried out in a consecutive way as the material passed through three different sets of calender rolls before wind up. Additional processing steps can be placed between and among calendering operations. For example, the material produced by applying three polymer layers to a glass fiber web could be passed through a printing process, to provide a decorative image and to facilitate chemical embossing. This distinct printing step could be followed by another melt calendering step to apply a wear layer to the floor covering. A heat treatment step could follow the application of the wear layer, either in a continuous or discontinuous fashion. The heat treatment could expand the various layers through the formulation of a chemical foam, in those layers containing a chemical blowing agent.

In the melt calendering process, a polymer melt is applied to a series of two or more heated rolls in such a way to produce a polymer layer of uniform thickness. The melt can be prepared by mixing the polymers and non-polymeric components of the material under conditions of elevated temperatures and shear. Devices such as extruders or mixers can be used for this process. More detailed descriptions of the melt calendering process can be found in Chapter 83 of "Handbook of Plastic Materials and Technology" by Irvin I. Rubin and published by John Wiley and Sons, Inc (ISBN 0-471-09634-2), the contents of which are hereby incorporated by reference.

Melt Extrusion

The floor covering structure, which is the subject of this invention, can also be prepared by melt extrusion. In such a process, one or more polymer layers can be applied to a continuous web or substrate in a single extrusion operation. When co-extrusion is used to provide multiple layers in a single pass, a separate extruder is used to feed each melt to the sheet die block. Extrusion operations can be intermixed with other processing steps in preparing the final structure. A thermal treatment can follow the application of a wear layer in either a continuous or discontinuous fashion. This treatment can enhance the final product by expansion of layers containing chemical blowing agents and/or crosslinking of layers containing crosslinking systems.

Melt Spreading

The floor covering can be prepared using a melt spreading approach that can be extended in scope by using fugitive and/or permanent processing aids or plasticizers. This involves adding a liquid or liquids to the various polymeric formulations used to make the discrete layers of the final structure. Such an addition can be used to lower the temperature needed to obtain the viscosity needed for good processing. For example, white spirit, petroleum ether, or mineral spirits can be blended with a polylactide layer system using heat and shear mixing to produce a homogenous low viscosity material which can be processed at a lower temperature than would otherwise be possible. This is a fugitive system as the white spirit or other plasticiser evaporates from the surface of the structure after the system has been applied. Preferably, the vaporized white spirit or other plasticiser is captured, condensed, and recycled. Alternatively, a non-volatile liquid plasticiser, such as liquid paraffin (mineral oil) can be used. In this case, the resulting floor covering structure will retain this material as a permanent component. Mixed systems of fugitive and permanent liquids can also be used. The range for such additives can extend from 200% to less than 5%, on a weight basis of polylactide.

The present invention will be better understood with reference to the following non-limiting examples.

EXAMPLE 1

Preparation of Polymeric Materials

Component Chemical Information

The material identifications in this document refer to the following products:

A4 (or A-4): Citroflex® A-4, acetyl tributyl citrate. Product of Morflex, Inc., Greensboro, N.C.

AC597 (or AC-597): Honeywell A-C® 597, ethylene-propylene maleic anhydride copolymer, CAS # 31069-12-2. Product of Honeywell Specialty Chemical Co., 101 Columbia Rd. Morristown, N.J. 07962.

AC950 (or AC-950): Honeywell A-C® 950, ethylene-propylene maleic anhydride copolymer, CAS # 31069-12-2. Product of Honeywell Specialty Chemical Co., 101 Columbia Rd. Morristown, N.J. 07962.

AC1221 (or AC-1221): Honeywell A-C® 1221, ethylene-propylene maleic anhydride copolymer, CAS # 31069-12-2. Product of Honeywell Specialty Chemical Co., 101 Columbia Rd. Morristown, N.J. 07962.

Benzoyl Peroxide (or BPO): Luperox® A98, benzoyl peroxide 97%. Product of Atofina Chemicals, Inc., 2000 Market St., Philadelphia, Pa. 19103. Distributed by Aldrich Chemical Co., catalog # 17,998-1. Aldrich Chemical Co., P.O. Box 355, Milwaukee, Wis. 53201.

BSO: Vikoflex® 7040, butyl epoxy soyate. Product of Atofina Chemicals, Inc., 2000 Market St., Philadelphia, Pa. 19103.

Dicumyl peroxide: CAS # 83-43-3. Product of Aldrich Chemical Co., P.O. Box 355, Milwaukee, Wis. 53201.

DOA: Dioctyl adipate, catalog number 52,519-7. Distributed by Aldrich Chemical Co., catalog # 17,998-1. Aldrich Chemical Co., P.O. Box 355, Milwaukee, Wis. 53201.

DOP: Dioctyl phthalate, phthalic acid bis (2-ethylhexyl ester). CAS # 117-81-7. Supplied by Sigma Chemical Co., PO Box 14508, St. Louis, Mo. 63178.

Eastar Bio GP®: Biodegradable copolyester. Product of Eastman Chemical Co., Inc., Eastman Rd., Kingsport, Tenn. 37662.

ESO: Vikoflex® 7170, epoxidized vegetable oil. Product of Atofina Chemicals, Inc., 2000 Market St., Philadelphia, Pa. 19103.

EOSO: Vikoflex® 4050, epoxidized octyl soyate. Product of Atofina Chemicals, Inc., 2000 Market St., Philadelphia, Pa. 19103.

Limestone: Fine-40 mesh, crushed limestone powder, calcium carbonate. Supplied by Armstrong World Industries, 2500 Columbia, Lancaster, Pa. 17603. Distrubuted by Global Stone PenRoc, Inc., Cincinnati, Ohio.

Maleic anhydride (or MA): CAS # 108-31-6. Distributed by Aldrich Chemical Co., catalog # 17,998-1. Aldrich Chemical Co., P.O. Box 355, Milwaukee, Wis. 53201.

MELO: Vikoflex® 9010, methyl epoxy linseedate. Product of Atofina Chemicals, Inc., 2000 Market St., Philadelphia, Pa. 19103.

MSO: Vikoflex® 7010, epoxidized methyl soyate. Product of Atofina Chemicals, Inc., 2000 Market St., Philadelphia, Pa. 19103.

OELO: Vikoflex® 9080, octyl epoxy linseedate. Product of Atofina Chemicals, Inc., 2000 Market St., Philadelphia, Pa. 19103.

Perkadox® 14-40B: Di-(2-tert-butylperoxyisopropyl) benzene on inert filler. Product of Akzo Nobel Chemicals, Inc., 2153 Lockport-Olcott Rd., Burt, N.Y. 14028.

PLA (or PLLA): Biomer® L9000, polylactic acid pellet. Product of Biomer, Forst-Kasten-Straβe 15, D-82152, Krailling, Germany.

Triganox® 17-40B: n-Butyl 4,4-di-(tert-butylperoxy)valerate on inert filler. Product of Akzo Nobel Chemicals, Inc., 2153 Lockport-Olcott Rd., Burt, N.Y. 14028.

Triganox® 29-40B: 1,1-Di-(tert-butylperoxy)-3,3,5-trimethylcyclohexane on inert filler. Product of Akzo Nobel Chemicals, Inc., 2153 Lockport-Olcott Rd., Burt, N.Y. 14028.

Triganox® 101-45B: 2,5-Dimethyl-2,5-di-(tert-butylperoxy)hexane on inert filler. Product of Akzo Nobel Chemicals, Inc., 2153 Lockport-Olcott Rd., Burt, N.Y. 14028.

General Material Processing Conditions

Pellets (PLA, or PLA blended with AC597, AC950, AC1221, Elvax, Eastar Bio GP®, PCL, PHB, or combinations thereof) were fed with a K-Tron K2V-T20 twin auger feeder. Kopal resin, dicumyl peroxide, d-Sorbitol, Triganox®, Perkadox®, and maleic anhydride powder were pre-measured into 1 minute feed quantities, and hand-fed into the feed throat. Liquids (A-4, BSO, DOA, DOP, ESO, EOSO, MELO, MSO, OELO, RA130MA20, or combinations thereof) were fed through size 15 Neoprene® Masterflex® tubing using a Masterflex® L/S model 75 18-12 pump head attached to a Masterflex® model 752450 Masterflex® peristaltic pump. Feed rates were determined by weighing output of mechanisms over 60 second period. Limestone was fed through an Acrison® 105-Z volumetric feeder. A pre-mixed dry mixture of 10% BPO and 90% limestone was fed through an Acrison® BDFM gravimetric feeder operating in internal volumetric mode. 99.5% limestone pre mixed with 0.5% Triganox® 29-40-B was also fed in this manner during later runs. Linear calibration scales of feed rate as a function of set point were established by weighing outputs at three setpoints. From these calibrations, feedrates were calculated and varied to control feed rates. Typical throughput rates were between 40 and 200 g/min. All materials were fed into the feed throat of a Werner & Pfleiderer ZSK30 co-rotating twin-screw extruder. The end of the Masterflex® tubing was positioned just above the screws in the extruder feed throat.

A schematic representation of the extruder feeding apparatus appears in FIG. 1. As shown in FIG. 1, a liquid plasticizer is passed from a plasticizer reservoir (10) by means of a peristaltic pump (20) to an extruder (60), where polylactic acid pellets are added by means of a pellet feeder (40), and a compatibilizer and filler are added by means of powder feeders (30 and 50). The mixture of plasticizer, polylactic acid, compatibilizer and filler is extruded at an elevated temperature to form extrudate 70.

Screw configuration and settings for the extruder are listed below, and a schematic of the extruder barrels and screw configuration appear in FIG. 2.

| Barrel Number | Configuration | Heat Zone | Temperature (C.) Set Point/Measured |
|---|---|---|---|
| 1 | Transition/Melt | — | No Thermocouple |
| 2 | Melt/Compression | 1 | 170/170 |
| 3 | Compression | 1 | 170/170 |
| 4 | Metering/Mixing | 2 | 175/175 |
| 5 | Compression | 2 | 175/175 |
| 6 | Metering/Mixing | 3 | 180/180 |
| 7 | Mixing/Metering | 3 | 180/180 |
| 8 | Metering/Compression | 4 | 180/180 |
| 9 | Compression | 4 | 180/180 |
| 10 | Compression | 5 | 180/180 |
| Die | 45-Degree Die Head | 6 | 135/180 |

Figure 2:
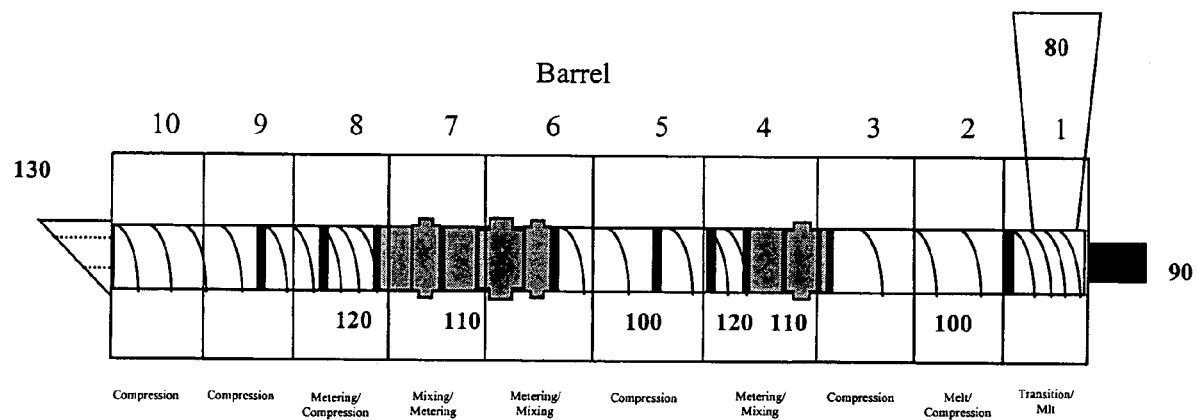
FIG. 2 is a schematic illustration of the extruder screws and barrels in a ZSK-30 extruder.

As shown in FIG. 2, materials are fed into the feed throat (80) in barrel 1, where they are rapidly heated, and conveyed by the screws (90) to Barrel 2. In Barrel 2, the polymer materials have nearly reached their melting temperatures, and are compressed by steep-pitch screw flite (100). In Barrel 3, the steep pitch flites continue to compress the materials, subjecting them to strong shear forces. In Barrel 4, kneading blocks (110) and reverse screw flites (120) vigorously mix the constituent materials. The back pressure in Barrel 3 forces the material on to Barrel 5, where the material is again compressed by steep pitch screw flites (100). Barrels 6 and 7 (also including kneading blocks (110) and reverse screw flites (120)) replicate the actions of Barrel 4. Barrels 8, 9, and 10 continue to compress and shear the materials. The back pressure from Barrel 7 drives the material to the die (130). In a steady state condition, the flow rate of material out the die orifice is constant, due to this back pressure. Since, in this embodiment, the slabs were collected through the open die head without any restrictive device such as a twin-orifice strand die, the melt pressure measured by the transducer in the die is virtually nil. However, when these materials are extruded through a twin 3 mm orifice die, melt pressures are typically 100-400 psi, depending on the formulation.

Screw rotation speed was 100 rpm. Typical torque was 15% of full scale. All barrel ports were closed. The first 150 seconds of extrudate were discarded. Thereafter, ten to eighteen nominal 2"×6"×½" slabs were collected on Teflon® sheets and allowed to cool to room temperature.

Figure 3:
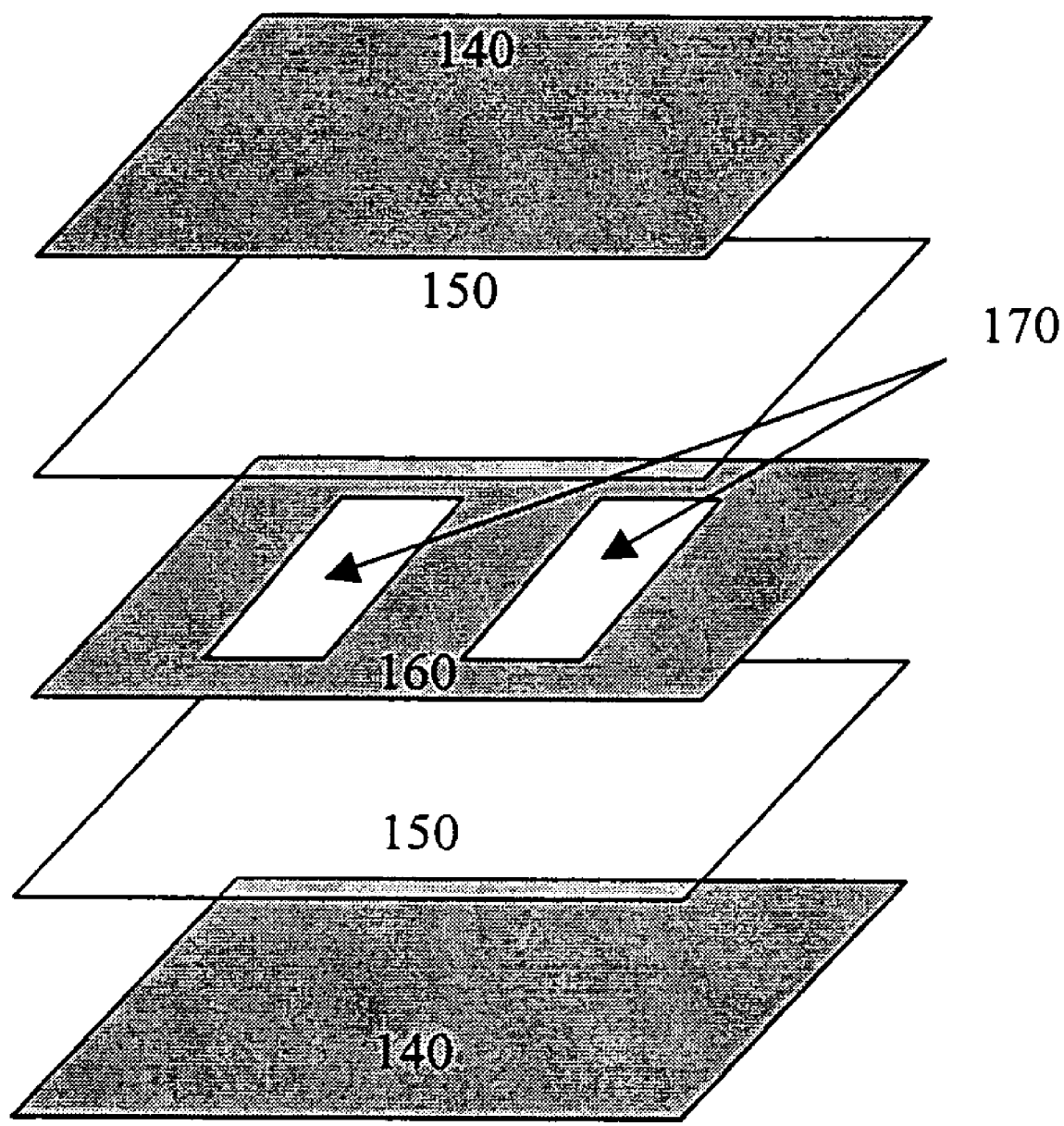
FIG. 3 is a schematic illustration of a compression mold sandwich.

The slabs were compression molded in a model 3925 Carver Hydraulic Lab Press. An 8"×10" steel plate 0.1" thick having two rectangular cavities each nominally 2"×8" with one polymer slab per cavity was sandwiched between two steel plates. A release film of 5-mil PTFE film was placed between the cavity sheet and each of the steel plates. A schematic representation of the compression molding sandwich appears in FIG. 3, where the compression mold sandwich includes steel plates (140), surrounding Teflon plates (150), which in turn surround a steel plate (160) that includes two cavities into which the slabs (170) are placed.

Figure 4:
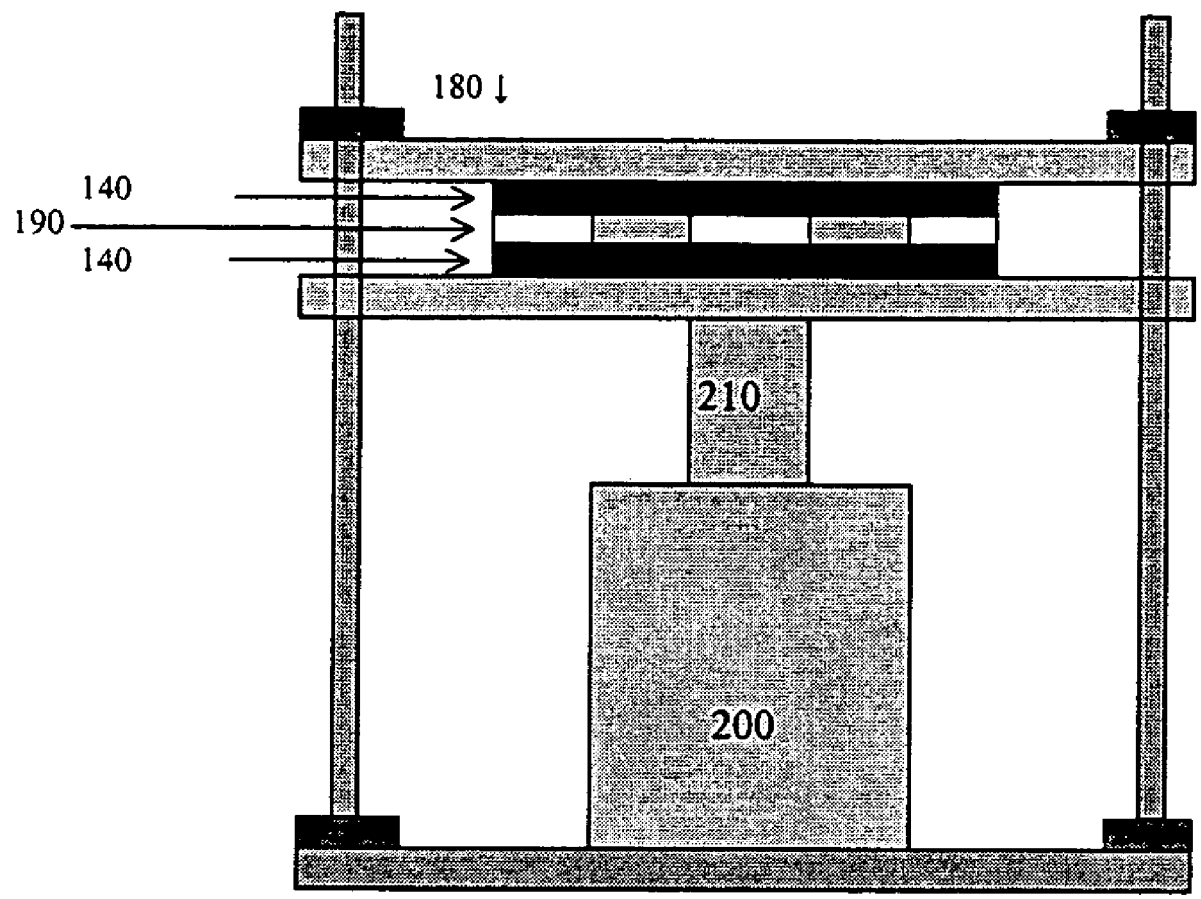
FIG. 4 is a schematic illustration of a slab compression molding apparatus.

A schematic representation of slab compression molding appears in FIG. 4. In this embodiment, the press platens (180) were preheated to 180° C. The cavity sandwich (190) was placed in the press. Platens were slowly brought together, using a hydraulic pump (200) to apply pressure to a ram (210) which in turn applied pressure to the bottommost press platen (180) until making full contact with the steel plates. A force of 7,500 lbs. was applied and maintained for 10 minutes. At the end of that segment of the pressing cycle, force was increased to 12,500 lbs., and maintained for 5 minutes. Thereafter, the pressure was maintained, water was supplied to the platens until the temperature reached 70° C., requiring 5 to 10 minutes. The mold sandwich was removed from the press, and the material plaques were recovered from the mold.

Summary of Testing Methods

The data that appears on the following tables were obtained by the following procedures. Early testing included tensile (D638) and 3-point flexural (D790) tests. However, these are not typical methods for characterizing flooring materials. Tensile data is of marginal importance for flooring materials, and was therefore discontinued. D790 testing is not practical for low modulus materials, which are the preponderance of materials that are characterized herein. The Olsen Stiffness Test (F1914) was initiated to obtain bending characterization data.

Notched Izod Impact Strength—Nominal 2.5"×0.5"×0.1" beams were sectioned from the compression molded plaques. Most sample sets were comprised of four specimens. 0.1" deep notches were cut into the beams using a TMI notch cutter.

Testing was performed on a Testing Machines Inc. 43-02-01 Monitor/Impact machine per ASTM D256. A 1 in-lb. pendulum was used to impact samples that were expected to yield impact strength less than 100 J/m. A 5 in-lb. pendulum was used to impact samples that were expected to yield impact strength greater than 100 J/m.

Impact strength mean and standard deviation were calculated by the TMI equipment firmware for all specimens. Specimens that did not break were excluded from these calculations. Data summaries were printed. Data were converted to metric units using a conversion factor of 54.23 J/m=1 in-lb.

Flexural Strength and Modulus—Nominal 3.0"×0.5"×0.1" beams were sectioned from the compression molded plaques. Most sample sets were comprised of four specimens.

Three-point flexural testing was performed on a United Testing System SFM-20 loadframe. System control and data analysis was performed using Datum software, per ASTM D790. Specimens were placed on a 2.00" span and loaded with a crosshead speed of 0.05 in/min. Deflection was measured by an LVDT deflectometer having a range of 0.0 to 0.8". Load was measured by a loadcell having a capacity of 20 lbf. Tests on specimens which had not failed at 0.45" deflection were operator-terminated. Strength was calculated using the peak load measured. Modulus was calculated as the slope of the tangent line of the first 5-10 data points on the load/deflection curve.

Tensile Strength, Modulus, and Elongation—Type I specimens were sectioned from the compression molded plaques and shaped using a Tensilkut jig and router. Most sample sets were comprised of four specimens.

Testing was performed per ASTM D638 using a United Testing System SFM-20 loadframe. System control and data analysis was performed using Datum software. Load was measured by a 1000 lbf. loadcell. Strain was measured by a model EXT62LOE laser extensometer with a 2" gage length. Crosshead speed was 0.2 in/min for modulus evaluation, 2.0 in/min to obtain the entire stress strain profile. Strength was calculated using the peak load measured. Modulus was calculated as the slope of the tangent line to the curve, below 10 lbs. of load. Elongation was measured where failure began to occur. Data was exported to an Excel spreadsheet and converted from English to SI units using a conversion factor of 6895 Pa=1 PSI.

Apparent Bending Modulus—Nominal 3.0"×0.5"×0.1" beams were sectioned from the compression molded plaques. Most sample sets were comprised of four specimens.

Testing was performed per ASTM D747 using a Tinnius-Olsen 6 in-lb. Capacity Stiffness Testing Machine. A 2.0 inch span was used. The mean modulus evaluated at 3, 6, 9, and 12 degrees deflection was reported as the Apparent Bending Modulus.

Indentation-Residual—Nominal 2"×2"×0.1" tabs were sectioned from the compression molded plaques. Most sample sets were comprised of one or two specimens.

Testing was performed per ASTM F1914, Specification F1303 Type II, at ambient environmental conditions, using apparatus designed and constructed at Michigan State University that conforms to F1914, ¶5.2. Initial thickness of the specimen was measured. A 75 lb. dead-weight load was applied for 15 minutes through a 0.25 in. diameter flat indenter tip. The indented thickness was measured. After a 60-minute recovery period with no applied load, the residual thickness was measured. Indentation was calculated as 100 times the ratio of the indented thickness to the intial thickness. Residual was calculated as 100 times the difference between the initial and final thickness, divided by the initial thickness. Mean percentage indentation and residual calculations are reported.

Target Mechanical Properties

Samples of existing commercially available PVC-based products were tested to obtain target values for material development, which values appear in Table 27. These values are not intended to limit the values for useful materials prepared as described herein, but instead represent values based on currently commercialized materials.

The target notched Izod impact strength for tile is at least about 10 J/m. The target range of apparent bending modulus for tile is between about 70 and 100 kpsi. The target range of indentation for tile is between about 90 and 100%. The target range of residual for tile is between 0 and about 5%. The target range of notched Izod impact strength for sheet is between about 80 and 500 J/m. The target range of apparent bending modulus for sheet is between about 10 and 50 kpsi. The target range of indentation for sheet is between about 85 and 100%. The target range of residual for sheet is between 0 and about 5%.

Many polylactide (PLA) based materials described herein, including a wide variety and range of additives including plasticizers, hybridized plasticizers, compatibilizers, crosslinkers, and fillers possess similar mechanical properties to traditional PVC based materials, making their formulations desirable for flooring and other applications. Virtually all of the formulations exhibited physical properties within the desirable ranges. These formulations are presented in Tables 2-27.

Formulations and Mechanical Properties Index of Tables

| # | Formulations |
|---|---|
| 2 | (a, b) PLA:AC950 |
| 3 | PLA:A4:Honeywell AC- copolymers |
| 4 | PLA:A4:Honeywell AC- copolymers |
| 5 | PLA:MSO:Honeywell AC- copolymers |
| 6 | PLA:ESO:Honeywell AC- copolymers |
| 7 | PLA:ESO:Honeywell AC- copolymers |
| 8 | 75% PLA:15% A4 or MSO plasticizer, 10% Honeywell AC- copolymers |
| 9 | PLA:A4:MSO hybrid plasticizers and AC-950 copolymer |
| 10 | PLA:A4:MSO hybrid plasticizers and AC-950 copolymer |
| 11 | PLA:DOP and PLA:MSO:DOP hybrid plasticizers |
| 12 | PLA:DOA and PLA:MSO:DOA hybrid plasticizers |
| 13 | PLA:MSO:AC-950, benzoyl peroxide, 30% limestone |
| 14 | PLA:MSO:Benzoyl Peroxide:Honeywell AC-copolymers |
| 15 | 55:40:5 PLA:MSO:AC-950, dicumyl peroxide, 30% limestone |
| 16 | PLA:Eastar Bio GP |
| 17 | PLA:MSO:AC-950, benzoyl peroxide, maleic anhydride, 30% limestone |
| 18 | PLA:MSO:AC-950, 0.5% Triganox or Perkadox, 30% limestone |
| 19 | PLA:MSO:AC-950, 0.5% Triganox or Perkadox, 0.5% maleic anhydride, 30% limestone |
| 20 | PLA:MSO:AC-950, 0.5% Triganox or Perkadox, 1% maleic anhydride, 30% limestone |
| 21 | PLA:A4:AC-950, 30% Limestone |
| 22 | PLA:MSO:DOP hybrid, 0 or 0.5% benzoyl peroxide, 30 or 40% limestone |
| 23 | PLA:MSO:DOA:AC-950, 0 or 0.5% Triganox 29-40B, 29.5% limestone |
| 24 | PLA:A4:DOA:AC-950, 0.5% Triganox 29-40B 29.5% limestone |
| 25 | PLA:A4:MSO, AC-950, 0.5% Triganox 29-40B, 29.5% limestone |
| 26 | PLA:Epoxidized Vegetable Oil Esters(EVOE): AC-950, 0.5% Triganox 29-40B, 30% limestone |
| 27 | BioTile, Excelon ®, Medintech ®, and Possibilities ® |

EXAMPLE 1

Polylactide Base Composition with/without Compatibilizer and With/Without Plasticizer
(Tables 2A-8)

TABLE 2

Mechanical Properties of PLA and Honeywell A-C ®-950 Formulations

| Comp. | % AC-950 | Notched Izod Impact Strength (J/m) | Flexural Strength (MPa) | Flexural Modulus (GPa) | Tensile Strength (MPa) | Tensile Modulus (GPa) | Tensile Elongation (%) |
|---|---|---|---|---|---|---|---|
| Pure PLA | 0 | 34 +/− 7 | 97 +/− 6 | 2.9 +/− 0.2 | 56 +/− 7 | 3.0 +/− 0.1 | 2.0 +/− 0.3 |
| 9:1 PLA/AC-950 | 10 | 27 +/− 1 | 81 +/− 3 | 2.9 +/− 0.2 | 50 +/− 1 | 2.5 +/− 0.2 | 2.0 +/− 0.2 |

| | Notched Izod Impact Strength (J/m) | Apparent Bending Modulus (kpsi) | Indentation (%) | Residual (%) |
|---|---|---|---|---|
| Pure PLA | 34 +/− 7 | 418 +/− 78 | 97 | 0 |

TABLE 3

Mechanical Properties of PLA, A-4 Plasticizer, Honeywell A-C ®- Copolymer Formulations

| Comp. | % A-4 Plasticizer | Type & % AC- | Notched Izod Impact Strength (J/m) | Flexural Strength (MPa) | Flexural Modulus (Gpa) | Tensile Strength (MPa) | Tensile Modulus (GPa) | Tensile Elongation (%) |
|---|---|---|---|---|---|---|---|---|
| 85:15 PLA/AC-950 | 15 | none | 42 +/− 6 | 14 +/− 1 | 0.7 +/− 0.1 | 23 +/− 4 | 0.8 +/− 0.5 | 270 +/− 75 |
| 75:15:10 PLA/A-4/AC-597. | 15 | 10% AC597 | 220 +/− 160 | 4 +/− n/a | <0.7* | 22 +/− 1 | 0.3 +/− 0.1 | 240 +/− 2 |
| 75:15:10 PLA/A-4/AC-1221. | 15 | 10% AC1221 | 550 +/− 180 | 4 +/− n/a | <0.7* | 19 +/− 3 | 0.3 +/− 0.2 | 200 +/− 30 |

*indicates materials whose modulus is too low to be accurately tested by ASTM D790. For such materials, ASTM D747 is a more appropriate method for measuring stiffness. In most cases, the actual flexural modulus is much less than 0.7 Gpa.

TABLE 4

Mechanical Properties of PLA, A-4 Plasticizer, Honeywell AC- Copolymer Formulations

| Comp. | % A-4 | Type & % AC- | Notched Izod Impact Strength (J/m) | Apparent Bending Modulus (kpsi) | Indentation (%) | Residual (%) |
|---|---|---|---|---|---|---|
| 85:15 PLA/A-4 | 15 | none | 51 +/− 5 | 61 +/− 16 | 98 | 2 |
| 75:15:10 PLA/A-4/AC950. | 15 | 10% AC950 | 710 +/− 170 | 22 +/− 1 | 89 | 3 |

TABLE 5

Mechanical Properties of PLA, MSO plasticizer, Honeywell A-C ®- Copolymer Formulations

| Comp. | % MSO Plasticizer | Type & % AC | Notched Izod Impact Strength (J/m) | Flexural Strength (Mpa) | Flexural Modulus (Gpa) | Tensile Strength (Mpa) | Tensile Modulus (Gpa) | Tensile Elongation (%) |
|---|---|---|---|---|---|---|---|---|
| 16:3:1 PLA/MSO/AC-950 | 15 | 5% AC950 | 500 +/− 90 | 17 +/− 2 | 0.8 +/− 0.1 | 17 +/− 1 | 1.0 +/− 0.5 | 100 +/− 91 |
| 16:3:1 PLA/MSO/AC-1221 | 15 | 5% AC1221 | 400 +/− 200 | 21 +/− 5 | 0.8 +/− 0.2 | 18 +/− 2 | 0.9 +/− 0.1 | 50 +/− 74 |
| 16:3:1 PLA/MSO/AC-597 | 15 | 5% AC597 | 450 +/− 170 | 21 +/− 1 | 0.9 +/− 0.1 | 19 +/− 2 | 0.9 +/− 0.7 | 34 +/− 20 |
| 15:3:2 PLA/MSO/AC-950 | 15 | 10% AC950 | 290 +/− 40 | 11 +/− 1 | <0.7* | 18 +/− 2 | 0.2 +/− 0.1 | 220 +/− 30 |
| 15:3:2 PLA/MSO/AC-1221 | 15 | 10% AC1221 | 410 +/− 200 | 17 +/− 2 | <0.7* | 18 +/− 3 | 0.9 +/− 0.6 | 14 +/− 8 |
| 15:3:2 PLA/MSO/AC-597 | 15 | 10% AC597 | 75 +/− 16 | 30 +/− 2 | 1.2 +/− 0.2 | 21 +/− 2 | 0.9 +/− 0.4 | 13 +/− 18 |

*indicates materials whose modulus is too low to be accurately tested by ASTM D790. For such materials, ASTM D747 is a more appropriate method for measuring stiffness. In most cases, the actual flexural modulus is much less than 0.7 Gpa.

TABLE 6

Mechanical Properties of PLA, ESO, Honeywell A-C ®- Copolymer Formulations

| Comp. | % ESO Plasticizer | Type & % AC- | Notched Izod Impact Strength (J/m) | Flexural Strength (Mpa) | Flexural Modulus (Gpa) | Tensile Strength (Mpa) | Tensile Modulus (Gpa) | Tensile Elongation (%) |
|---|---|---|---|---|---|---|---|---|
| 15:3:2 PLA/ESO/AC-950 | 15 | 10% AC950 | 39 +/− 5 | 46 +/− 2 | 2.4 +/− 0.2 | 28 +/− 2 | 2.0 +/− 0.3 | 1.4 +/− 0.1 |

TABLE 7

Mechanical Properties of PLA, ESO, Honeywell A-C ®- Copolymer Formulations

| Comp. | % ESO | Type & % AC- | Notched Izod Impact Strength (J/m) | Apparent Bending Modulus (kpsi) | Indentation (%) | Residual (%) |
|---|---|---|---|---|---|---|
| 15:3:2 PLA/ESO/AC597 | 15 | 10% AC597 | 35 +/− 3 | 217 +/− 28 | 99 | 0 |
| 15:3:2 PLA/ESO/AC1221 | 15 | 10% AC1221 | 31 +/− 1 | 250 +/− 11 | 98 | 1 |

TABLE 8

Comparative Mechanical Properties of 75% PLA, 15% A4 or MSO Plasticizer, 10% Honeywell A-C ® Copolymer Formulations

| Comp. | % & Type Plasticizer | Type & % AC | Notched Izod Impact Strength (J/m) | Flexural Strength (Mpa) | Flexural Modulus (Gpa) | Tensile Strength (Mpa) | Tensile Modulus (Gpa) | Tensile Elongation (%) |
|---|---|---|---|---|---|---|---|---|
| 15:3:2 PLA/A-4/AC-950 | 15% A4 | 10% AC950 | 100 +/− 15 | 5 +/− n/a | <0.7* | 19 +/− 4 | 0.5 +/− 0.4 | 190 +/− 45 |
| 15:3:2 PLA/MSO/AC-950 | 15% MSO | 10% AC950 | 290 +/− 40 | 11 +/− 1 | <0.7* | 18 +/− 2 | 0.2 +/− 0.1 | 220 +/− 30 |

TABLE 8-continued

Comparative Mechanical Properties of 75% PLA, 15% A4 or MSO Plasticizer, 10% Honeywell A-C ® Copolymer Formulations

| Comp. | % & Type Plasticizer | Type & % AC | Notched Izod Impact Strength (J/m) | Flexural Strength (Mpa) | Flexural Modulus (Gpa) | Tensile Strength (Mpa) | Tensile Modulus (Gpa) | Tensile Elongation (%) |
|---|---|---|---|---|---|---|---|---|
| 15:3:2 PLA/A-4/AC597 | 15% A4 | 10% AC597 | 220 +/− 160 | 4 +/− n/a | <0.7* | 22 +/− 1 | 0.3 +/− 0.1 | 240 +/− 2 |
| 15:3:2 PLA/MSO/AC597 | 15% MSO | 10% AC597 | 75 +/− 16 | 30 +/− 2 | 1.2 +/− 0.2 | 21 +/− 2 | 0.9 +/− 0.4 | 13 +/− 18 |
| 15:3:2 PLA/A-4/AC-1221 | 15% A4 | 10% AC1221 | 550 +/− 180 | 4 +/− n/a | <0.7* | 19 +/− 3 | 0.3 +/− 0.2 | 200 +/− 30 |
| 15:3:2 PLA/MSO/AC-1221 | 15% MSO | 10% AC1221 | 410 +/− 200 | 17 +/− 2 | <0.7* | 18 +/− 3 | 0.9 +/− 0.6 | 14 +/− 8 |

*indicates materials whose modulus is too low to be accurately tested by ASTM D790. For such materials, ASTM D747 is a more appropriate method for measuring stiffness. In most cases, the actual flexural modulus is much less than 0.7 Gpa.

EXAMPLE 2

Polylactide Base Composition with Hybrid Plasticizer and Compatibilizer (Table 9-12)

TABLE 9

Mechanical Properties of PLA, Hybrid Plasticizer, Honeywell A-C- Copolymer Formulations

| Comp. | Plasticizer Formulation | Type & % AC- | Notched Izod Impact Strength (J/m) | Flexural Strength (Mpa) | Flexural Modulus (Gpa) | Tensile Strength (Mpa) | Tensile Modulus (Gpa) | Tensile Elongation (%) |
|---|---|---|---|---|---|---|---|---|
| 8:1:1 PLA/A-4/MSO | 10% A4 10% MSO | none | 520 +/− n/a | 7 +/− 0 | <0.7* | 18 +/− 1 | 0.1 +/− 0.0 | 190 +/− 11 |
| 80:12:8 PLA/A-4/MSO | 12% A4 8% MSO | none | 560 +/− 160 | 8 +/− n/a | <0.7* | 18 +/− 2 | 0.1 +/− 0.0 | 670 +/− 330 |
| 80:14: PLA/A-4/MSO | 14% A4 6% MSO | none | 520 +/− 120 | 6 +/− 1 | <0.7* | 18 +/− 1 | 0.1 +/− 0.0 | 190 +/− 50 |
| 14:3:3 PLA/A-4/MSO | 15% A4 15% MSO | none | 420 +/− 110 | 7 +/− 1 | <0.7* | 12 +/− 4 | 0.1 +/− 0.0 | 120 +/− 100 |
| 35:9:6 PLA/A-4/MSO | 18% A4 12% MSO | none | 370 +/− 40 | 6 +/− 1 | <0.7* | 12 +/− 2 | 0.1 +/− 0.0 | 130 +/− 50 |
| 70:21:9 PLA/A-4/MSO | 21% A4 9% MSO | none | 260 +/− 190 | 5 +/− 1 | <0.7* | 11 +/− 1 | 0.1 +/− 0.1 | 110 +/− 20 |
| 20:3:2 PLA/A-4/ESO | 12% A4 8% ESO | none | 110 +/− 40 | 48 +/− 15 | 1.5 +/− 0.5 | 28 +/− 1 | 0.3 +/− 0.1 | 13 +/− 2 |
| 75:9:6:10 PLA/A-4/MSO/AC-950 | 9% A4 6% MSO | 10% AC950 | 490 +/− 100 | 3 +/− 0 | <0.7* | 17 +/− 0 | 0.4 +/− 0.2 | 136 +/− 12 |

*indicates materials whose modulus is too low to be accurately tested by ASTM D790. For such materials, ASTM D747 is a more appropriate method for measuring stiffness. In most cases, the actual flexural modulus is much less than 0.7 Gpa.

TABLE 10

Mechanical Properties of PLA, Hybrid Plasticizer, Honeywell AC- Copolymer Formulations

| Comp. | Plasticizer Formulation | Type & % AC- | Notched Izod Impact Strength (J/m) | Apparent Bending Modulus (kpsi) | Indentation (%) | Residual (%) |
|---|---|---|---|---|---|---|
| 85:9:6 PLA/A-4/MSO | 9% A4 6% MSO | none | 65 +/− n/a | 9 +/− 2 | 79 | 5 |

TABLE 11

Mechanical Properties of PLA, DOP, and MSO:DOP Hybrid Plasticizers

| Comp. | Notched Izod Impact Strength (J/m) | Apparent Bending Modulus (kpsi) | Indentation (%) | Residual (%) |
|---|---|---|---|---|
| 70:30 PLA:DOP | 236 +/− 38 | 235 +/− 21 | 97 | 0 |
| 60:30:10 PLA:DOP:AC950 | 50 +/− 2 | 172 +/− 20 | 98 | 0 |

TABLE 11-continued

Mechanical Properties of PLA, DOP, and MSO:DOP Hybrid Plasticizers

| Comp. | Notched Izod Impact Strength (J/m) | Apparent Bending Modulus (kpsi) | Indentation (%) | Residual (%) |
|---|---|---|---|---|
| 70:25:5 PLA:MSO:DOP | 345 +/− 39 | 21 +/− 2 | 85 | 8 |
| 75:20:5 PLA:MSO:DOP | 266 +/− 27 | 41 +/− 4 | 95 | 0 |
| 70:20:10 PLA:MSO:DOP | 286 +/− 25 | 63 +/− 3 | 96 | 2 |
| 70:15:15 PLA:MSO:DOP | 444 +/− 15 | 68 +/− 5 | 97 | 1 |
| 70:10:20 PLA:MSO:DOP | 548 +/− 40 | 103 +/− 6 | 97 | 2 |

TABLE 12

Mechanical Properties of PLA, DOA, and MSO:DOA Hybrid Plasticizers

| Composition | Notched Izod Impact Strength (J/m) | Apparent Bending Modulus (kpsi) | Indentation (%) | Residual (%) |
|---|---|---|---|---|
| 70:30 PLA:DOA | 120 +/− 4 | 284 +/− 23 | 98 | n/a |
| 70:20:10 PLA:MSO:DOA | >500 | 75 +/− 5 | 96 | 1 |
| 70:5:25 PLA:MSO:DOA | 437 +/− 49 | 222 +/− 40 | 99 | 1 |
| 70:15:5:10 PLA:MSO:DOA:AC950 | 180 +/− 8 | 84 +/− 10 | 96 | 2 |
| 65:20:10:5 PLA:MSO:DOA:AC950 | >500 | 80 +/− 8 | 98 | 1 |

EXAMPLE 3

Polylactide base composition with Plasticizer, Compatibilizer with free radical cross linker and filler (Tables 13, 14, & 15)

TABLE 13

PLA, MSO, Honeywell A-C ® -950 Copolymer, Benzoyl Peroxide, Filled with 30 (+0/−2) weight % Limestone: Mechanical Properties

| PLA % | MSO % | Honeywell AC950 % | Benzoyl Peroxide % | Notched Izod Impact Strength (J/m) | Apparent Bending Modulus (kpsi) | Indentation % | Residual % |
|---|---|---|---|---|---|---|---|
| 65 | 25 | 10 | 0 | 165 +/− 22 | 16 +/− 3 | 89 | 3 |
| (139 parts of this mixture/60 parts limestone/1 part BPO) | | | | | | | |
| 60 | 30 | 10 | 0 | 194 +/− 39 | 32 +/− 6 | 91 | 3 |
| (7 parts of this mixture/3 parts limestone) | | | | | | | |
| 60 | 30 | 10 | 0.5 | 221 +/− 54 | 22 +/− 2 | 91 | 3 |
| (139 parts of this mixture/60 parts limestone/1 part BPO) | | | | | | | |
| 60 | 30 | 10 | 2 | 124 +/− 17 | 15 +/− 3 | 90 | 4 |
| (34 parts of this mixture/15 parts limestone/1 part BPO) | | | | | | | |

TABLE 14

Mechanical Properties of PLA, MSO plasticizer, BPO (crosslinker), & Honeywell A-C ®- Copolymer Formulations

| Comp. | % MSO | Type & % AC- | BPO % | Notched Izod Impact Strength (J/m) | Apparent Bending Modulus (kpsi) | Indentation (%) | Residual (%) |
|---|---|---|---|---|---|---|---|
| 13:6:1 PLA/MSO/AC950. 200 parts of this mixture/1 part BPO. | 30 | 5% AC950 | 0.5 | 560 +/− 60 | 11 +/− 5 | 95 | 0 |
| 13:6:1 PLA/MSO/AC950. 100 parts of this mixture/1 part BPO. | 30 | 5% AC950 | 1 | 158 +/− 188 | 28 +/− 5 | 96 | 1 |

TABLE 14-continued

Mechanical Properties of PLA, MSO plasticizer, BPO (crosslinker), & Honeywell A-C ®- Copolymer Formulations

| Comp. | % MSO | Type & % AC- | BPO % | Notched Izod Impact Strength (J/m) | Apparent Bending Modulus (kpsi) | Indentation (%) | Residual (%) |
|---|---|---|---|---|---|---|---|
| 13:6:1 PLA/MSO/AC950 50 parts of this mixture/1 part BPO | 30 | 5% AC950 | 2 | 330 +/− 146 | 36 +/− 8 | 95 | 1 |

TABLE 15

55:40:5 PLA:MSO:AC950 Base Polymer/Dicumyl Peroxide/Filled with 30 (+0/−2) weight % Limestone: Mechanical Properties

| PLA:MSO: AC950 % | Dicumyl Peroxide % | Notched Izod Impact Strength (J/m) | Apparent Bending Modulus (kpsi) | Indentation % | Residual % |
|---|---|---|---|---|---|
| 70 | 1.0 | 128 +/− 85 | 17 +/− 2 | 96 | 0 |

EXAMPLE 4

Polylactide Base Composition with One Additional Polymer (Table 16)

TABLE 16

Mechanical Properties of PLA, Eastar Bio GP

| Comp. | Notched Izod Impact Strength (J/m) | Apparent Bending Modulus (kpsi) | Indentation (%) | Residual (%) |
|---|---|---|---|---|
| 50:50 PLA:Eastar Bio GP | 96 +/− 5 | 47 +/− 3 | 98 | 1 |
| Pure PLA 100% PLA | 34 +/− 7 | 418 +/− 78 | 97 | 0 |

EXAMPLE 5

Polylactide Base Composition with Plasticizer, Compatibilizer with BPO as Free Radical Crosslinker, Maleic Anhydride and Filler (Table 17)

TABLE 17

PLA:MSO:A-C ® 950 Base Polymer/BPO/Maleic Anhydride, Filled with 30 (+/−0.2) wt % Limestone: Mechanical Properties

| PLA:MSO:AC950 Ratio % | Maleic Anhydride % | Benzoyl Peroxide % | Notched Izod Impact Strength (J/m) | Apparent Bending Modulus (kpsi) | Indentation % | Residual % |
|---|---|---|---|---|---|---|
| 65:25:10 (278 parts of this mixture/117 parts limestone/4 parts maleic anhydride/1 part BPO) | 1.0 | 0.25 | 111 +/− 18 | 26 +/− 1 | 88 | 5 |
| 65:25:10 (278 parts of this mixture/115 parts limestone/6 parts maleic anhydride/BPO) | 1.5 | 0.25 | 120 +/− 23 | 57 +/− 3 | 95 | 2 |
| 65:25:10 (278 parts of this mixture/113 parts limestone/8 parts maleic anhydride/1 part BPO) | 2.0 | 0.25 | 89 +/− 10 | 72 +/− 4 | 98 | 0 |
| 60:30:10 (272 parts of this mixture/123 parts limestone/4 parts maleic anhydride/1 part BPO) | 1.0 | 0.25 | 131 +/− 15 | 48 +/− 3 | 94 | 3 |
| 60:30:10 (272 parts of this mixture/119 parts limestone/8 parts maleic anhydride/1 part BPO) | 2.0 | 0.25 | 118 +/− 5 | 51 +/− 1 | 96 | 1 |
| 60:30:10 (136 parts of this mixture/59 parts limestone/4 parts maleic anhydride/part BPO) | 2.0 | 0.5 | 84 +/− 4 | 63 +/− 3 | 96 | 1 |
| 60:30:10 (136 parts of this mixture/57 parts limestone/6 parts maleic anhydride/1 part BPO) | 3.0 | 0.5 | 93 +/− 17 | 58 +/− 5 | 98 | 1 |
| 60:30:10 (68 parts of this mixture/28 parts limestone/3 parts maleic anhydride/1 part BPO) | 3.0 | 1.0 | 58 +/− 17 | 58 +/− 10 | 98 | 0 |
| 60:30:10 (68 parts of this mixture/27 parts limestone/3 parts maleic anhydride/2 parts BPO) | 3.0 | 2.0 | 29 +/− 3 | 60 +/− 7 | 98 | 0 |

EXAMPLE 6

Polylactide Base Composition with MSO Plasticizer, Compatibilizer, Filler and Various Crosslinkers (Table 18)

TABLE 18

PLA:MSO:AC950 Base Polymer/0.5% Triganox (T-) and Perkadox (P-)/Filled with 30 weight % Limestone: Mechanical Properties

| PLA:MSO:AC950 Ratio % | Type of Peroxide | Notched Izod Impact Strength (J/m) | Apparent Bending Modulus (kpsi) | Indentation % | Residual % |
|---|---|---|---|---|---|
| 65:25:10 | T-17-40B | 50 +/− 19 | 102 +/− 16 | 98 | 0 |
| (139 parts of this mixture/60 parts limestone/1 part Triganox 17-40B) | | | | | |
| 65:25:10 | T-29-40B | 226 +/− 69 | 25 +/− 3 | 91 | 2 |
| (139 parts of this mixture/60 parts limestone/1 part Triganox 29-40B) | | | | | |
| 65:25:10 | T-101-45B | 123 +/− 34 | 75 +/− 40 | 99 | 1 |
| (139 parts of this mixture/60 parts limestone/1 part Triganox 101-45B) | | | | | |
| 65:25:10 | P-14-40B | 189 +/− 15 | 18 +/− 3 | 92 | 2 |
| (139 parts of this mixture/60 parts limestone/1 part Triganox 101-45B) | | | | | |
| 60:30:10 | T-17-40B | 232 +/− 46 | 66 +/− 11 | 97 | 1 |
| (139 parts of this mixture/60 parts limestone/1 part Triganox 17-40B) | | | | | |
| 60:30:10 | T-29-40B | 296 +/− 33 | 35 +/− 11 | 97 | 2 |
| (139 parts of this mixture/60 parts limestone/1 part Triganox 29-40B) | | | | | |
| 60:30:10 | T-101-45B | 208 +/− 38 | 27 +/− 2 | 93 | 1 |
| (139 parts of this mixture/60 parts limestone/1 part Triganox 101-45B) | | | | | |
| 60:30:10 | P-14-40B | 252 +/− 61 | 29 +/− 7 | 95 | 2 |
| (139 parts of this mixture/60 parts limestone/1 part Perkadox 14-40B) | | | | | |

EXAMPLE 7

Polylactide base composition with MSO Plasticizer, Compatibilizer, Maleic Anhydride, Filler and Various Crosslinkers (Tables 19, 20)

TABLE 19

PLA:MSO:AC950 Base Polymer/0.5% Triganox (T-) or Perkadox (P-)/0.5% Maleic Anhydride/Filled with 30 weight % Limestone: Mechanical Properties

| PLA:MSO:AC950 Ratio % | Type of Peroxide | Notched Izod Impact Strength (J/m) | Apparent Bending Modulus (kpsi) | Indentation % | Residual % |
|---|---|---|---|---|---|
| 65:25:10 | T-17-40B | 139 +/− 20 | 42 +/− 3 | 89 | N/A |
| (139 parts of this mixture/59 parts limestone/1 part maleic anhydride/1 part Triganox 17-40B) | | | | | |
| 65:25:10 | T-29-40B | 133 +/− 20 | 49 +/− 4 | 92 | N/A |
| (139 parts of this mixture/59 parts limestone/part maleic anhydride/part Triganox 29-40B) | | | | | |
| 65:25:10 | T-101-45B | 116 +/− 15 | 44 +/− 2 | 89 | N/A |
| (139 parts of this mixture/59 parts limestone/part maleic anhydride/part Triganox 101-45B) | | | | | |
| 65:25:10 | P-14-40B | 97 +/− 19 | 43 +/− 3 | 91 | N/A |
| (139 parts of this mixture/59 parts limestone/part maleic anhydride/1 part Perkadox 14-40B) | | | | | |
| 60:30:10 | T-17-40B | 117 +/− 20 | 37 +/− 3 | 88 | N/A |
| (139 parts of this mixture/9 parts limestone/part maleic anhydride/Triganox 17-40B) | | | | | |
| 60:30:10 | T-29-40B | 136 +/− 36 | 53 +/− 16 | 98 | N/A |
| (139 parts of this mixture/59 parts limestone/1 part maleic anhydride/1 part Triganox 29-40B) | | | | | |
| 60:30:10 | T-101-45B | 116 +/− 15 | 44 +/− 2 | 89 | N/A |
| (139 parts of this mixture/59 parts limestone/1 part maleic anhydride/1 part Triganox 101-45B) | | | | | |
| 60:30:10 | P-14-40B | 176 +/− 12 | 28 +/− 4 | 86 | N/A |
| (139 parts of this mixture/59 parts limestone/1 part maleic anhydride/1 part Perkadox 14-40B) | | | | | |

TABLE 20

PLA:MSO:AC950 Base Polymer/0.5% Triganox (T-) or Perkadox (P-)/1% Maleic Anhydride/Filled with 30 weight % Limestone: Mechanical Properties

| PLA:MSO:AC950 Ratio % | Type of Peroxide | Notched Izod Impact Strength (J/m) | Apparent Bending Modulus (kpsi) | Indentation % | Residual % |
|---|---|---|---|---|---|
| 65:25:10 | T-17-40B | 131 +/− 11 | 58 +/− 3 | 95 | 2 |
| (139 parts of this mixture/58 parts limestone/2 parts maleic anhydride/1 part Triganox 17-40B) | | | | | |
| 65:25:10 | T-29-40B | 60 +/− 4 | 64 +/− 4 | 98 | 1 |
| (139 parts of this mixture/58 parts limestone/2 parts maleic anhydride/1 part Triganox 29-40B) | | | | | |
| 65:25:10 | T-101-45B | 16 +/− 18 | 76 +/− 12 | 98 | 1 |
| (139 parts of this mixture/58 parts limestone/2 parts maleic anhydride/1 part Triganox 101-45B) | | | | | |
| 65:25:10 | P-14-40B | 56 +/− 14 | 55 +/− 8 | 96 | 1 |
| (139 parts of this mixture/58 parts limestone/2 parts maleic anhydride/1 part Perkadox 14-40B) | | | | | |

EXAMPLE 8

Polylactide Base Composition with Citrate Plasticizer, Compatibilizer, with Crosslinker, and Filler (Table 21)

TABLE 21

PLA:A4:AC950 Base Polymer/Filled with 30 (+0/−0.5) weight % Limestone: Mechanical Properties

| PLA:A4:AC950 Ratio % | Peroxide Type | Peroxide % | Notched Izod Impact Strength (J/m) | Apparent Bending Modulus (kpsi) | Indentation % | Residual % |
|---|---|---|---|---|---|---|
| 75:15:10 | T29-40B | 0.5 | 112 +/− 28 | 60 +/− 16 | 98 | 1 |
| 70:20:10 | T29-40B | 0.5 | >500 | 11 +/− 1 | 97 | 1 |

EXAMPLE 9

Polylactide Base Composition with Hybrid Plasticizer, Compatibilizer, with or without Crosslinkers, and Filler (Tables 22-25)

TABLE 22

PLA:MSO:DOP Hybrid Plasticizer Base Polymer/0 or 0.5% BPO/Filled with 30 or 40 weight % Limestone: Mechanical Properties

| Limestone % | PLA:MSO:DOP:AC950 Ratio % | Benzoyl Peroxide % | Notched Izod Impact Strength (J/m) | Apparent Bending Modulus (kpsi) | Indentation % | Residual % |
|---|---|---|---|---|---|---|
| 30 | 65:20:5:10 | 0.5 | 65 +/− 5 | 41 +/− 3 | 96 | 1 |
| 30 | 70:25:5:0 | 0 | 199 +/− 18 | 33 +/− 4 | 92 | 4 |
| 40 | 70:25:5:0 | 0 | 126 +/− 22 | 42 +/− 6 | 92 | 4 |
| 30 | 70:15:15:0 | 0 | 69 +/− 2 | 107 +/− 6 | 98 | 1 |
| 40 | 70:15:15:0 | 0 | 39 +/− 10 | 98 +/− 15 | 96 | 2 |
| 30 | 75:20:5:0 | 0 | 155 +/− 6 | 93 +/− 6 | 93 | 4 |
| 40 | 75:20:5:0 | 0 | 142 +/− 6 | 98 +/− 15 | 95 | 3 |

TABLE 23

PLA:MSO:DOA:AC950 Hybrid Plasticizer Base Polymer, Blended with 0 or 0.5% Triganox 29-40B, Filled with 30 (+0/−0.5) weight % Limestone: Mechanical Properties

| PLA:MSO:DOA:AC950 Ratio % | Triganox 29-40B % | Notched Izod Impact Strength (J/m) | Apparent Bending Modulus (kpsi) | Indentation % | Residual % |
|---|---|---|---|---|---|
| 65:20:10:5 (7 parts of this mixture, 3 parts limestone) | 0.0 | 132 +/− 14 | 39 +/− 5 | 96 | 1 |
| 65:20:10:5 (140 parts of this mixture/59 parts limestone/1 part Triganox 29-40B) | 0.5 | 161 +/− 57 | 42 +/− 4 | 94 | 2 |
| 70:20:10:0 (7 parts of this mixture, 3 parts limestone) | 0.0 | 123 +/− 14 | 111 +/− 15 | 97 | 0 |
| 70:20:10:0 (140 parts of this mixture/59 parts limestone/1 part Triganox 29-40B) | 0.5 | 149 +/− 18 | 95 +/− 15 | 98 | 1 |
| 70:15:5:10 (140 parts of this mixture/59 parts limestone/1 part Triganox 29-40B) | 0.5 | 75 +/− 6 | 94 +/− 6 | 97 | 1 |

TABLE 24

PLA:A4:DOA:AC950 Hybrid Plasticizer Base Polymer, Blended with 0.5% Triganox 29-40B, Filled with 29.5 weight % Limestone: Mechanical Properties

| PLA:A4:DOA:AC950 Ratio % | Triganox 29-40B % | Notched Izod Impact Strength (J/m) | Apparent Bending Modulus (kpsi) | Indentation % | Residual % |
|---|---|---|---|---|---|
| 65:20:10:5 | 0.5 | 281 +/− 44 | 18 +/− 1 | 93 | 2 |
| 70:15:5:10 | 0.5 | >500 | 13 +/− 2 | 94 | 1 |
| 75:15:10:0 | 0.5 | 165 +/− 13 | 20 +/− 4 | 92 | 3 |

TABLE 25

PLA:A4:MSO::AC950 Hybrid Plasticizer Base Polymer/0.5% Triganox 29-40B/Filled with 29.5 weight % Limestone: Mechanical Properties

| PLA:A4:MSO:AC950 Ratio % | Triganox 29-40B % | Notched Izod Impact Strength (J/m) | Apparent Bending Modulus (kpsi) | Indentation % | Residual % |
|---|---|---|---|---|---|
| 70:10:10:10 | 0.5 | 228 +/− 54 | 10 +/− 1 | 94 | 1 |
| 70:5:15:10 | 0.5 | 161 +/− 36 | 12 +/− 3 | 95 | 1 |

EXAMPLE 10

Polylactide Base Composition with Various Epoxidized Vegetable Oil Ester (EVOE) Plasticizers, Compatibilizer, with Crosslinkers, and Filler (Table 26)

TABLE 26

PLA:Epoxidized Vegetable Oil Esters(EVOE):AC950 Base Polymer/0.5% Triganox 29-40B/Filled with 30 weight % Limestone: Mechanical Properties

| PLA:EVOE:AC950 Ratio % | EVOE ID | Notched Izod Impact Strength (J/m) | Apparent Bending Modulus (kpsi) | Indentation % | Residual % |
|---|---|---|---|---|---|
| 65:25:10 | BSO | 82 +/− 5 | 104 +/− 5 | 97 | 3 |
| 65:25:10 | OELO | 47 +/− 3 | 123 +/− 4 | 99 | 1 |
| 65:25:10 | MELO | 99 +/− 16 | 66 +/− 13 | 98 | 0 |
| 65:25:10 | EOSO | 32 +/− 3 | 152 +/− 4 | 98 | 1 |

EXAMPLE 11

One Embodiment of a Polylactide Base Floor Tile Composition with Citrate and MSO Hybrid Plasticizer, Compatibilizer, and Filler (Table 27)

TABLE 27

Medintech ®, Possibilities ®, Excelon ® and (BioTile: 14.9% PLA + 2.0% AC-950 + 2.8% A-4 + 4.5% MSO + 75.8% Limestone): Mechanical Properties

| Comp. | Notched Izod Impact Strength (J/m) | Apparent Bending Modulus (kpsi) | Mean Break Angle Degrees | Indentation % | Residual % |
|---|---|---|---|---|---|
| Tile Materials | | | | | |
| Excelon - Machine Direction | 14.4 +/− 0.4 | 80 +/− 10 | 18 | 98 | 0 |
| Excelon- Across Machine Direction | 13.4 +/− 0.5 | 80 +/− 6 | 14 | 98 | 0 |
| BioTile- White | 15.3 +/− 0.7 | 98 +/− 4 | 10 | 98 | 1 |
| BioTile- Grey | 15.0 +/− 0.9 | 93 +/− 5 | 9 | 98 | 1 |
| BioTile- Black | 15.0 +/− 1.2 | 74 +/− 4 | 16 | 98 | 0 |
| Sheet Materials | | | | | |
| Possibilities- Machine Direction | Not Available | 35 +/− 2 | none | 90 | 2 |
| Possibilities- Across Machine Direction | Not Available | 23 +/− 3 | none | 90 | 2 |
| Medintech- Machine Direction | Not Available | 10 +/− 0 | none | 87 | 1 |
| Medintech- Across Machine Direction | Not Available | 12 +/− 1 | none | 87 | 1 |

Table 27 data notes:
Mean Break Angle refers to the angle of deflection at which the specimen exhibited a catastrophic failure during Olsen Stiffness testing (ASTM D747). Medintech ® and Possibilities ® specimens did not break.
Notched Izod Impact Strength data of for Medintech and Possibilities is not available. Due to the curved nature of rolled sheet material, ASTM D256 testing is not possible.

Summary of the Data from the Working Examples

The addition of 10% w/w of the maleated ethylene propylene A-C®-950 copolymer (Table 2 A) does not have a significant effect on mechanical properties of polylactide composition in terms of increase Izod impact strength and reduce tensile modulus.

The impact strength of polylactide compositions with 15% w/w A-4 plasticizer that did not include the Honeywell A-C® copolymer was not significantly affected relative to those that included the copolymer. However, incorporating 15% w/w A-4 plasticizer along with 10% w/w of different Honeywell A-C® Copolymers (e.g. AC597, AC1221) as compatibilizers increased the net Izod impact strength as well as tensile elongation, and reduced tensile modulus by very significant amount (Table 3). As shown in Table 3, a PLA composition with 15% w/w A-4 plasticizer displays a five to thirteen fold increase in impact strength from 42 to 220 J/m and 42 to 550 J/m, when compounded with Honeywell A-C® copolymers. A PLA composition with 15% w/w A-4 plasticizer displays a 70% reduction in flexural strength from 14 to 4 MPa, and a significant reduction in flexural modulus, when compounded with Honeywell A-C®-copolymers. The tensile modulus of PLA with 15% w/w A-4 plasticizer is reduced by more than half, from 800 to 300 MPa when compounded with Honeywell A-C® copolymers. Tensile strength and elongation are not significantly affected.

Analysis of the above data confirms that both the Citroflex® A-4 (acetyl tributyl citrate) plasticizer as well as a compatibilizing agent are required to obtain acceptable properties for the polylactide composition in the context of floor material. The compatibilizer promotes the interphase adhesion between the polylactide and the plasticizer.

The polylactide composition with 15% w/w A-4 plasticizer was also made with 10% w/w Honeywell AC950 copolymer. The resulting polymeric material displayed a fourteen-fold increase in impact strength, from 50 to 700 J/m, when compounded with Honeywell AC950 copolymer (Table 4). PLA with 15% w/w A-4 plasticizer displays a 40% reduction in bending modulus, from 60 to 22 kpsi, when compounded with Honeywell AC950 copolymer. The indentation-residual response is slightly decreased, by about 10% (from 98 to 89%) indentation, and 50% (from 2 to 3%) residual. The 15% A4 plasticized blend of 75% PLA/10% AC-950 exhibits mechanical properties within the desirable range for a flooring material. C® Copolymer Formulations Compared with Table 2, the addition of 15% w/w MSO (methyl ester of epoxidized soy oil) as a plasticizer to PLA in the presence of A-C®-copolymers (Table 5) increases impact strength two to fourteen times, from 30 to between 75 and 500 J/m. Flexural modulus is decreased by as much as 70% or more, from 2900 to less than 700 Mpa. The resulting materials exhibit properties within the desirable range for flooring materials.

Tables 2, 6, and 7 show that 15% ESO and 10% w/w AC-copolymers added to PLA does not improve impact strength, but reduces the modulus of PLA by about one half, from 420 to 235 kpsi.

Table 8 shows that 10% w/w AC-copolymers compounded with 75% w/w PLA and 15% MSO or A-4 produces materials with properties desirable in a flooring material.

Table 9 shows that when 20-30% w/w of a hybrid plasticizer including A-4: MSO in ratios ranging from 1:1 to 7:3 is compounded with PLA, very high impact strength (500 J/m) and very low flexural modulus (less than 700 MPa) materials result. The addition of 10% w/w AC-950 copolymer does not diminish these properties. When 30% w/w 3:2 A-4:ESO hybrid plasticizer is compounded with PLA, moderate impact strength (100 J/m) and moderate flexural modulus (1500 MPa) results. These materials exhibit desirable properties for floor materials.

Table 10 shows that when 15% w/w hybrid plasticizer including 3:2 A-4: MSO is compounded with PLA, a low impact strength (65 J/m) and very low bending modulus (9 kpsi) material results. Tables 9 and 10 show that A4:MSO hybrid plasticizers produce desirable properties for floor materials when added to PLA above a 15% w/w loading.

Table 11 shows that in the absence of AC-950 compatibilizer, 30% w/w DOP added to PLA increases impact strength by a factor of seven, from 35 to 240 J/m. However, the bending modulus is very high, 235 kpsi. MSO and DOP may be blended to achieve high impact strength, over 250 J/m, and low bending modulus, down to 20 kpsi, using techniques well known to those of skill in the art and using no more than routine experimentation. The ratio of MSO to DOP can be altered to achieve properties across the desirable range for flooring materials.

Comparison of Table 2 and Table 12 shows that the impact strength of PLA increased threefold from 35 to 120 J/m by the addition of 30% w/w DOA plasticizer. MSO and DOA may be blended in different ratios to achieve a range of impact strength between 120 to over 500 J/m. Higher concentrations of plasticizer, 30% or more, yield higher impact strength. A 1:5 ratio of MSO:DOA yielded a modulus of 200 kpsi, and a 2:1 MSO:DOA ratio yielded a modulus of 75 kpsi. By increasing the MSO/DOA ratio, the modulus may be reduced. This hybrid plasticizer may also be used in the presence of AC-950 copolymer without adversely affecting the physical properties. The same plasticizer, 30% w/w 2:1 MSO:DOA with 0 or 5% w/w AC950 added to PLA yields virtually identical properties. The ratio of MSO:DOA and the weight content of the plasticizer can be varied using no more than routine experimentation to achieve material properties across the range of desirable properties for flooring materials.

Table 13 shows that 0-2% w/w benzoyl peroxide can be added to PLA/MSO/AC-950 limestone-filled materials to provide polymer materials with properties that are desirable in flooring materials.

The addition of small amounts of benzoyl peroxide as a crosslinker has a stiffening effect on the polylactide composition plasticized with 30% w/w MSO and compatibilized with 5% w/w AC950. Bending modulus increases four times(10 to 40 kpsi) from a 0.5% to a 2.0% w/w benzoyl peroxide content (Table 14). By controlling the crosslinker content, the properties of the material can be engineered across the acceptable range of desirable properties for flooring materials.

Table 15 shows that a 30% w/w filled material blended with a 55% w/w PLA based polymer can be plasticized with 40% w/w MSO and 5% w/w AC-950 compatibilizer, in the presence of dicumyl peroxide, to produce materials having desirable properties for flooring materials (impact strength 130 J/m, bending modulus approximately 15 kpsi).

Eastar Bio GP co-polyester, with its glass transition temperature of −30° C. and crystalline melting point of 100° C., acts as a plasticizer and toughener of PLA. The 8-fold reduction in PLA modulus from 420 to 47 kpsi, and 2.5 fold increase in PLA impact strength from 35 to 95 make Eastar Bio a practical additive to PLA-based floor materials (Table 16).

Table 17 shows that increasing the maleic anhydride level as a compatibilizer from 1-3% w/w in the presence of 30% w/w limestone-filled material made with a polymer including 60-65% w/w PLA, 25-30% w/w MSO, 10% w/w AC-950 and 0.25%-2% w/w benzoyl peroxide increases modulus and decreases impact strength. Low levels of maleic anhydride (1% w/w) and benzoyl peroxide (0.25% w/w) are indicated for the most desirable properties for a flooring material (modulus of 25 kpsi, impact of 115 J/m and indentation (88%)-residual (5%).

Table 18 shows the additives Perkadox 14-40B, Triganox 17-40B, 29-40B, and 101-45B in 30% w/w limestone filled material made with a polymer including 60-65% w/w PLA, 25-30% w/w MSO, 10% w/w AC950 yield desirable properties for a flooring material. Triganox 29-40B and 14-40B added materials exhibited the most desirable properties (modulus of 18-35 kpsi, impact strength of 190-300 J/m and indentation (91-97%)-residual (2%).

Tables 18 & 19 show that the additives Perkadox 14-40B, Triganox 17-40B, 29-40B, and 101-45B in 30% w/w limestone filled material made with a polymer including 60-65% w/w PLA, 25-30% w/w MSO, 10% w/w AC-950 in the presence of 0.5% maleic anhydride compatibalizer yielded desirable properties for a flooring material, though less desirable than without the maleic anhydride. Materials with maleic anhydride had moduli between 28 and 49 kpsi, materials without maleic anhydride had moduli between 18 and 102 kpsi. Materials with maleic anhydride had impact strengths between 97-176 J/m; materials without maleic anhydride had impact strengths between 50-296 J/m.

Tables 18-20 show that increasing the additive level of maleic anhydride to 1% in the presence of additives Perkadox 14-40B, Triganox 17-40B, 29-40B, and 101-45B in 30% w/w limestone filled material made with a polymer comprised of 65% w/w PLA, 25% w/w MSO, 10% w/w AC950 yields unacceptable mechanical properties for a flooring material. Materials with 1% maleic anhydride had moduli between 55 and 76 kpsi, whereas materials without maleic anhydride had moduli between 18 and 102 kpsi. Materials with maleic anhydride had impact strengths between 16-131 J/m, whereas materials without maleic anhydride had impact strengths between 50 and 296 J/m. Accordingly, for the materials in these tables, the maleic anhydride levels in these materials should be below 1% w/w when the material is to be used in flooring applications.

Table 21 shows that a 30% w/w filled material blended with a 70-75% w/w PLA based polymer and 0.5% w/w Triganox 29-40B crosslinker can be plasticized with 25-30% w/w and 10% w/w AC950 compatibilizer, to produce materials having desirable properties for flooring materials (impact strength 100+ J/m, bending modulus 11-60 kpsi).

Table 22 shows that, in a material containing 30-40% w/w limestone and 60-70% w/w polymer made of 70-75% w/w PLA and 25-30% w/w MSO:DOP plasticizer, the ratio of MSO:DOP hybrid plasticizer can be varied in a range of ratios from 1:1 to 4:1 to achieve a wide range of impact strength and bending modulus. In a 30% limestone-filled material, a 30% w/w plasticizer including 1:1 MSO:DOP yielded low impact strength (40 J/m) and high modulus (100 kpsi). As the ratio of MSO/DOP was increased, impact strength increased and modulus decreased. At a 5:1 MSO:DOP ratio, impact strength was 200 J/m and bending modulus was 35 kpsi. Similar results were observed for a 75% PLA 25% MSO:DOP plasticized polymer material with 30-40% limestone filler. The higher MSO:DOP ratio materials have desirable properties for a flooring material.

Replacing 10% w/w PLA with 5%w/w AC950 in a 30% limestone filled material with 65% w/w PLA and 25% w/w hybrid plasticizer, MSO/DOP reduced impact strength from 150 to 65 J/m, and increased bending modulus from 40 to 100 kpsi. 10% w/w AC950 is not an attractive additive for polymers containing 65% PLA and 25% high-ratio (4/1) MSO/DOP plasticizer for flooring applications.

Table 23 shows that adding 0.5% Triganox 29-40B has little or no effect on the mechanical properties of a 30% w/w limestone-filled material made with a base polymer of 65-70% PLA plasticized with 30% 2:1 MSO:DOA, with or without 5% w/w AC-950 copolymer.

In addition, a 30% w/w limestone-filled material made with a base polymer of 65% PLA plasticized with 30% 2:1

MSO:DOA and 5% AC950 copolymer has a much lower modulus (40 kpsi) and similar impact strength (140 J/m) than a 30% w/w limestone-filled material made with a base polymer of 70% PLA plasticized with 30% 2:1 MSO:DOA (100 kpsi, 140 J/m, respectively). For these materials, the AC950 compatibilizer should be present to produce materials with desirable properties for flooring applications.

Table 24 shows that a 30% w/w filled material blended with a 65-75% w/w PLA-based polymer and 0.5% w/w Triganox 29-40B crosslinker can be plasticized with a range of A4/DOA hybrid plasticizer 20-30% polymer w/w, with or without AC-950 compatibalizer, to produce materials having desirable properties for flooring materials. The properties can be engineered by varying the ratio of A4 to DOA.

Table 25 shows that a 30% w/w filled material blended with a 70% w/w PLA based polymer and 0.5% w/w Triganox 29-40B crosslinker can be plasticized with a 20% w/w A4:MSO hybrid plasticizer and 10% w/w AC-950 compatibalizer to produce materials having desirable properties for flooring materials (impact strength between 150 and 230 J/m, bending modulus approximately 10 kpsi).

Table 26 shows that EVOE plasticizers at a 25% w/w loading in the presence of A-C-950 compatibalizer change the properties of PLA to within the desirable range for flooring materials (100 J/m impact strength, 65-150 kpsi bending modulus). Butyl epoxy soyate (BSO) and methyl epoxy linseedate (MELO) have better plasticizing effects than octyl epoxy linseedate (OELO) and epoxidized octyl soyate (EOSO).

The embodiment referred to on Table 27 is referred to here as BioTile. The mechanical properties of BioTile are very similar to those an existing commercially available tile flooring product (Armstrong Excelon®). This particular embodiment of polylactide-based composites demonstrates the applicability of the invention for tile flooring materials.

As seen in Tables 3-27, a wide combination of additives, plasticizers, hybridized plasticizers, crosslinkers, and compatibalizers can be blended with PLA to produce materials with mechanical properties similar to existing commercially available sheet flooring products (for example, Armstrong Medintech® and Possibilities®). These results demonstrate the applicability of the materials described herein for sheet flooring materials.

Having disclosed the subject matter of the present invention, it should be apparent that many modifications, substitutions and variations of the present invention are possible in light thereof. It is to be understood that the present invention can be practiced other than as specifically described. Such modifications, substitutions and variations are intended to be within the scope of the present application.

The invention claimed is:

1. A process for preparing a polymeric material comprising the steps of
   a) preparing a mixture comprising a polylactic acid-based polymeric material, a plasticizer and a compatibilizer, wherein the plasticizer is an ester of an epoxidized vegetable oil,
   b) heating the mixture,
   c) forming the heated mixture into a desired shape, and
   d) solidifying the formed, heated mixture by cooling.

2. The process of claim 1, wherein the components of the mixture are mixed in an extruder.

3. The process of claim 1, wherein the mixture is heated above the melting point of the polylactic acid-based polymeric material.

4. The process of claim 1 wherein the polylactic acid-based polymeric material comprises predominantly poly-L-lactide.

5. The process of claim 1, wherein the polylactic acid-based polymeric material comprises between about 30 to about 50 percent by weight of a polymer selected from the group consisting of polyvinyl chloride, polyethylene glycol, polyglycolide, ethylene vinyl acetate, polycarbonate, polycaprolactone, a polyhydroxyalkanoate, a polyolefin modified with at least one polar group other than the compatibilizer, and combinations thereof.

6. The process of claim 5, wherein the polyolefin modified with at least one polar functional group is an ionomer.

7. The process of claim 1, wherein a filler is added to the mixture subsequent to step a.

8. The process of claim 1, wherein the compatibilizer is present in an amount between about 5 and about 10% by weight based on the polymeric material.

9. The process of claim 1, wherein the plasticizer is present in an amount between about 10 and about 50% by weight based on the polymeric material.

10. The process of claim 9, wherein the plasticizer is present in an amount between about 25 and about 35% by weight based on the polymeric material.

11. A decorative surface covering comprising the polymeric material prepared in accordance with the process of claim 1.

12. The decorative surface covering of claim 11, wherein the decorative surface covering is a floor covering.

13. The process of claim 1, wherein the heated mixture is formed into a sheet.

14. A composition comprising a polymeric material comprising a polylactic acid-based polymeric material, a plasticizer and a compatibilizer, wherein the plasticizer is an ester of an epoxidized vegetable oil.

15. The composition of claim 14, wherein the polylactic acid-based polymeric material comprises predominantly poly-L-lactide.

16. The composition of claim 14, wherein the polylactic acid-based polymeric material comprises between about 30 percent and about 50 percent by weight of a polymer selected from the group consisting of polyvinyl chloride, polyethylene glycol, polyglycolide, ethylene vinyl acetate, polycarbonate, polycaprolactone, a polyhydroxyalkanoate, a polyolefin modified with at least one polar group other than the compatibilizer, and combinations thereof.

17. The composition of claim 14, wherein the material further comprises a filler.

18. The composition of claim 14, wherein the compatibilizer is present in an amount between about 5 and about 10% by weight based on the polymeric material.

19. The composition of claim 14, wherein the plasticizer is present in an amount between about 10 and about 50% by weight based on the polymeric material.

20. The composition of claim 19, wherein the plasticizer is present in an amount between about 25 and about 35% by weight based on the polymeric material.

21. A decorative surface covering comprising the polymeric composition of claim 14.

22. The composition of claim 14, further comprising a nanocomposite material.

23. The composition of claim 22, wherein the nanocomposite comprises an organoclay.

24. A sheet material comprising the polymeric composition of claim 14.

25. A decorative surface covering comprising the sheet material of claim 24.

26. The process of claim 1, wherein the mixture further comprises at least one component selected from the group consisting of cellulosic fibers, an additional polymer selected from the group consisting of polyvinyl chloride, polyethylene glycol, polyglycolide, ethylene vinyl acetate and polycarbonate, an antioxidant, a UV light absorber, a UV light stabilizer, a lubricant, a processing aid, a thermal stabilizer, an inorganic filler, a flame retardant, a crosslinking agent, an anti-static additive, a rosin, a nanocomposite, a blowing agent, a blowing agent activator, and a blowing agent inhibitor.

27. The process of claim 26, wherein the inorganic filler is selected from the group consisting of titanium dioxide, calcium carbonate, talc, wollastonite, glass fibers, mica, silica, alumina trihydrate and magnesium hydroxide.

28. A process for preparing a substantially elastomer-free composition comprising the steps of
a) preparing a mixture comprising a polylactic acid-based polymeric material, a plasticizer and a compatibilizer, wherein the plasticizer is an ester of an epoxidized vegetable oil,
b) heating the mixture,
c) forming the heated mixture into a desired shape, and
d) solidifying the formed, heated mixture by cooling.

29. The composition of claim 14, further comprising at least one component selected from the group consisting of cellulosic fibers, an additional polymer selected from the group consisting of polyvinyl chloride, polyethylene glycol, polyglycolide, ethylene vinyl acetate and polycarbonate, an antioxidant, a UV light absorber, a UV light stabilizer, a lubricant, a processing aid, a thermal stabilizer, an inorganic filler, a flame retardant, a crosslinking agent, an anti-static additive, a rosin, a nanocomposite, a blowing agent, a blowing agent activator, and a blowing agent inhibitor.

30. The composition of claim 29, wherein the inorganic filler is selected from the group consisting of titanium dioxide, calcium carbonate, talc, wollastonite, glass fibers, mica, silica, alumina trihydrate and magnesium hydroxide.

31. A substantially elastomer-free composition comprising a polylactic acid-based polymeric material, a plasticizer and a compatibilizer, wherein the plasticizer is an ester of an epoxidized vegetable oil.

32. The process of claim 1, wherein the plasticizer is selected from the group consisting of methyl epoxy linseedate, epoxidized methyl soyate, octyl epoxy linseedate and combinations thereof.

33. The composition of claim 14, wherein the plasticizer is selected from the group consisting of methyl epoxy linseedate, epoxidized methyl soyate, octyl epoxy linseedate and combinations thereof.

34. The process of claim 26, wherein the plasticizer is selected from the group consisting of methyl epoxy linseedate, epoxidized methyl soyate, octyl epoxy linseedate and combinations thereof.

35. The process of claim 28, further comprising adding at least one component selected from the group consisting of cellulosic fibers, an additional polymer selected from the group consisting of polyvinyl chloride, polyethylene glycol, polyglycolide, ethylene vinyl acetate and polycarbonate, an antioxidant, a UV light absorber, a UV light stabilizer, a lubricant, a processing aid, a thermal stabilizer, an inorganic filler, a flame retardant, a crosslinking agent, an anti-static additive, a rosin, a nanocomposite, a blowing agent, a blowing agent activator, and a blowing agent inhibitor to the mixture in step a.

36. The process of claim 35, wherein the inorganic filler is selected from the group consisting of titanium dioxide, calcium carbonate, talc, wollastonite, glass fibers, mica, silica, alumina trihydrate and magnesium hydroxide.

37. The composition of claim 29, wherein the plasticizer is. selected from the group consisting of methyl epoxy linseedate, epoxidized methyl soyate, octyl epoxy linseedate and combinations thereof.

38. A process for preparing a substantially elastomer-free composition, the composition being free of reinforcing fiber other than glass fibers and natural fibers, comprising the steps of
a) preparing a mixture comprising a polylactic acid-based polymeric material, a plasticizer and a compatibilizer, wherein the plasticizer is an ester of an epoxidized vegetable oil,
b) heating the mixture,
c) forming the heated mixture into a desired shape, and
d) solidifying the formed, heated mixture by cooling.

39. The process of claim 38, wherein the mixture of step a further comprises at least one component selected from the group consisting of an additional polymer selected from the group consisting of polyvinyl chloride, polyethylene glycol, polyglycolide, ethylene vinyl acetate and polycarbonate, an antioxidant, a UV light absorber, a UV light stabilizer, a lubricant, a processing aid, a thermal stabilizer, an inorganic filler, a flame retardant, a crosslinking agent, an anti-static additive, a rosin, a nanocomposite, a blowing agent, a blowing agent activator, and a blowing agent inhibitor.

40. The process of claim 39, wherein the inorganic filler is selected from the group consisting of titanium dioxide, calcium carbonate, talc, wollastonite, mica, silica, alumina trihydrate and magnesium hydroxide.

41. A substantially elastomer-free composition, the composition being free of reinforcing fiber other than glass fibers and natural fibers, comprising a polylactic acid-based polymeric material, a plasticizer and a compatibilizer, wherein the plasticizer is an ester of an epoxidized vegetable oil.

42. The composition of claim 41, further comprising at least one component selected from the group consisting of an additional polymer selected from the group consisting of polyvinyl chloride, polyethylene glycol, polyglycolide, ethylene vinyl acetate and polycarbonate, an antioxidant, a UV light absorber, a UV light stabilizer, a lubricant, a processing aid, a thermal stabilizer, an inorganic filler, a flame retardant, a crosslinking agent, an anti-static additive, a rosin, a nanocomposite, a blowing agent, a blowing agent activator, and a blowing agent inhibitor.

43. The composition of claim 42, wherein the inorganic filler is selected from the group consisting of titanium dioxide, calcium carbonate, talc, wollastonite, mica, silica, alumina trihydrate and magnesium hydroxide.

* * * * *